United States Patent [19]

Zasio et al.

[11] Patent Number: 4,924,430

[45] Date of Patent: May 8, 1990

[54] STATIC TIMING ANALYSIS OF SEMICONDUCTOR DIGITAL CIRCUITS

[75] Inventors: John J. Zasio, Sunnyvale; Kenneth C. Choy, Fremont; Darrell R. Parham, Sunnyvale, all of Calif.

[73] Assignee: Teradyne, Inc., Boston, Mass.

[21] Appl. No.: 149,555

[22] Filed: Jan. 28, 1988

[51] Int. Cl.⁵ .................. G06F 15/60; G06F 11/00
[52] U.S. Cl. .................... 364/578; 364/488; 371/23
[58] Field of Search ............... 364/578, 488, 489, 490, 364/491; 371/23

[56] References Cited

U.S. PATENT DOCUMENTS

| | | | |
|---|---|---|---|
| 4,263,651 | 4/1981 | Donath et al. | 364/491 |
| 4,527,249 | 7/1985 | Van Brunt | 364/578 |
| 4,654,851 | 3/1987 | Busby | 371/23 |
| 4,698,760 | 10/1987 | Lembach et al. | 364/490 |
| 4,725,975 | 2/1988 | Sasaki | 364/491 |
| 4,744,084 | 5/1988 | Beck et al. | 364/578 |
| 4,763,288 | 8/1988 | Deering et al. | 364/578 |
| 4,791,593 | 12/1988 | Hennion | 364/578 |

Primary Examiner—Felix D. Gruber
Assistant Examiner—V. N. Trans
Attorney, Agent, or Firm—A. C. Smith

[57] ABSTRACT

The time verification scheme of the present invention operates without input stimulus to calculate delays along circuit paths including logic elements or cells from initial input to final output, or over sub-circuit paths, of a proposed logic design. The delay calculations include cell-dependent, and layout-dependent, and environmental-dependent factors to account for response delays on rising and falling signal; capacitance loading, temperature-dependency and voltage-dependency of a proposed logic design to provide output histograms and reports of information about overall performance, and timing violations of the proposed logic design with respect to operating parameters that can be selectively adjusted for manufacturing variations.

11 Claims, 42 Drawing Sheets

TIMVER — DESIGN ALU4 — START OF PATHS COMMAND:

TIMVER PATH — LONG PATH NUM — 1 **********

| STEP DELAY | | TRANSITION | | CUMULATIVE DELAY | | LOADS | WR_CAP | OBJ. | PIN: | TYPE |
|---|---|---|---|---|---|---|---|---|---|---|
| TU | TD | TR | TF | RISE-IN | FALL-IN | | | | | |
| 0.000 | 0.000 | 2.500 | 1.500 | 0.000 u | 0.000 d | 3.000 | 0.300 | ALU4, | B1 | |
| 0.000 | 0.000 | 2.500 | 1.500 | 0.000 u | 0.000 d | | | ii | A | INV |
| 1.436 | 1.473 | 1.229 | 0.676 | 1.473 d | 1.436 u | 2.000 | 0.200 | ii | N | INV |
| 0.000 | 0.000 | 1.229 | 0.676 | 1.473 d | 1.436 u | | | b10 | C | NAND3 |
| 1.365 | 1.811 | 1.007 | 0.428 | 2.837 u | 3.247 d | 1.000 | 0.100 | b10 | N | NAND3 |
| 0.000 | 0.000 | 1.007 | 0.428 | 2.837 u | 3.247 d | | | b1 | B | AND2 |
| 4.483 | 3.387 | 3.811 | 1.556 | 7.320 d | 6.633 u | 8.000 | 0.800 | b1 | N | AND2 |
| 0.000 | 0.000 | 3.811 | 1.556 | 7.320 d | 6.633 u | | | c33 | C | AND3 |
| 2.927 | 2.378 | 0.765 | 0.386 | 10.247 u | 9.012 d | 1.000 | 0.100 | c33 | N | AND3 |
| 0.000 | 0.000 | 0.765 | 0.386 | 10.247 u | 9.012 d | | | c34 | A | NAND3 |
| 1.054 | 1.444 | 1.007 | 0.428 | 11.691 d | 10.066 u | 1.000 | 0.100 | c34 | N | NAND3 |
| 0.000 | 0.000 | 1.007 | 0.428 | 11.691 d | 10.066 u | | | c3 | A | AND4 |
| 2.758 | 1.865 | 0.850 | 0.404 | 13.556 d | 12.824 u | 1.000 | 0.100 | c3 | N | AND4 |
| 0.000 | 0.000 | 0.850 | 0.404 | 13.556 d | 12.824 u | | | x3 | B | XOR2 |
| 6.156 | 5.912 | 2.935 | 1.441 | 19.468 d | 18.980 u | 3.000 | 1.200 | x3 | N | XOR2 |
| 0.000 | 0.000 | 2.935 | 1.441 | 19.468 d | 18.980 u | | | e0 | A | NAND4 |
| 1.293 | 2.369 | 1.130 | 0.646 | 20.760 u | 21.348 d | 1.000 | 0.100 | e0 | N | NAND4 |
| 0.000 | 0.000 | 1.130 | 0.646 | 20.760 u | 21.348 d | | | e1 | A | INV |
| 2.457 | 1.984 | 2.575 | 1.275 | 22.744 d | 23.805 u | 2.000 | 1.100 | e1 | N | INV |
| 0.000 | 0.000 | 2.575 | 1.275 | 22.744 d | 23.805 u | | | ALU4, | AEQB; | |

Figure 6f

TIMVER — DESIGN C_ALU4 — START OF PATHS COMMAND:

TIMVER PATH — SETUP VIOLATION, NUM — 1 **********

START LATCH CLOCK PATH DELAY = 5.822

END LATCH CLOCK PATH DELAY = 4.534

ABSOLUTE SLOW TO RELATIVE FAST SKEW = -1.288

| STEP DELAY | | TRANSITION | | CUMULATIVE DELAY | | LOADS | WR_CAP | OBJ. | PIN. | TYPE |
|---|---|---|---|---|---|---|---|---|---|---|
| TU | TD | TR | TF | RISE-IN | FALL-IN | | | | | |
| 0.000 | 0.000 | 2.033 | 0.870 | 0.000 u | 0.000 d | 3.000 | 0.300 | r2.b1 | C[1]; | DFF |
| 3.069 | 3.116 | 1.883 | 0.995 | 3.069 u | 3.116 d | 3.000 | 0.300 | r2.b1 | Q[1]; | DFF |
| 0.000 | 0.000 | 1.883 | 0.995 | 3.069 u | 3.116 d | | | au.i1 | A[1]; | INV |
| 1.325 | 1.366 | 1.229 | 0.676 | 4.436 d | 4.442 u | 2.000 | 0.200 | au.i1 | Z ; | INV |
| 0.000 | 0.000 | 1.229 | 0.676 | 4.436 d | 4.442 u | | | au.b10 | C ; | NAND3 |
| 1.365 | 1.811 | 1.007 | 0.428 | 5.800 u | 6.252 d | 1.000 | 0.100 | au.b10 | Z ; | NAND3 |
| 0.000 | 0.000 | 1.007 | 0.428 | 5.800 u | 6.252 d | | | au.b1 | B ; | AND2 |
| 4.483 | 3.387 | 3.811 | 1.556 | 10.283 u | 9.639 d | 8.000 | 0.800 | au.b1 | Z ; | AND2 |
| 0.000 | 0.000 | 3.811 | 1.556 | 10.283 u | 9.639 d | | | au.c33 | C ; | AND3 |
| 2.927 | 2.378 | 0.765 | 0.386 | 13.210 u | 12.017 d | 1.000 | 0.100 | au.c33 | Z ; | AND3 |
| 0.000 | 0.000 | 0.765 | 0.386 | 13.210 u | 12.017 d | | | au.c34 | A ; | NAND3 |
| 1.054 | 1.444 | 1.007 | 0.428 | 14.654 d | 13.071 u | 1.000 | 0.100 | au.c34 | Z ; | NAND3 |
| 0.000 | 0.000 | 1.007 | 0.428 | 14.654 d | 13.071 u | | | au.c3 | A ; | AND4 |
| 2.758 | 1.865 | 0.850 | 0.404 | 16.519 d | 15.830 u | 1.000 | 0.100 | au.c3 | Z ; | AND4 |
| 0.000 | 0.000 | 0.850 | 0.404 | 16.519 d | 15.830 u | | | au.x3 | B ; | XOR2 |
| 4.500 | 4.777 | 1.139 | 0.678 | 21.296 d | 20.329 u | 2.000 | 0.200 | au.x3 | Z[3]; | XOR2 |
| 0.000 | 0.000 | 1.139 | 0.678 | 21.296 d | 20.329 u | | | r3.b3 | D[3]; | DFF |
| 3.000 | 3.000 | 1.139 | 0.678 | 24.296 d | 23.329 u | | | r3.b3 | C[3]; | DFF |

PERIOD + CLK - EN - CLK_ST - PATH - NET_SKEW = SLACK 25.000 + 4.534 - 4.822 - 24.296 - 1.000 = -0.584 ns

1 CLOCK VIOLATIONS, 0 HOLD VIOLATIONS, 1 SETUP VIOLATIONS
RECOMMENDED LOWER LIMIT ON CLOCK CYCLE TO AVOID SETUP VIOLATIONS 25.585 ns

Figure 6g

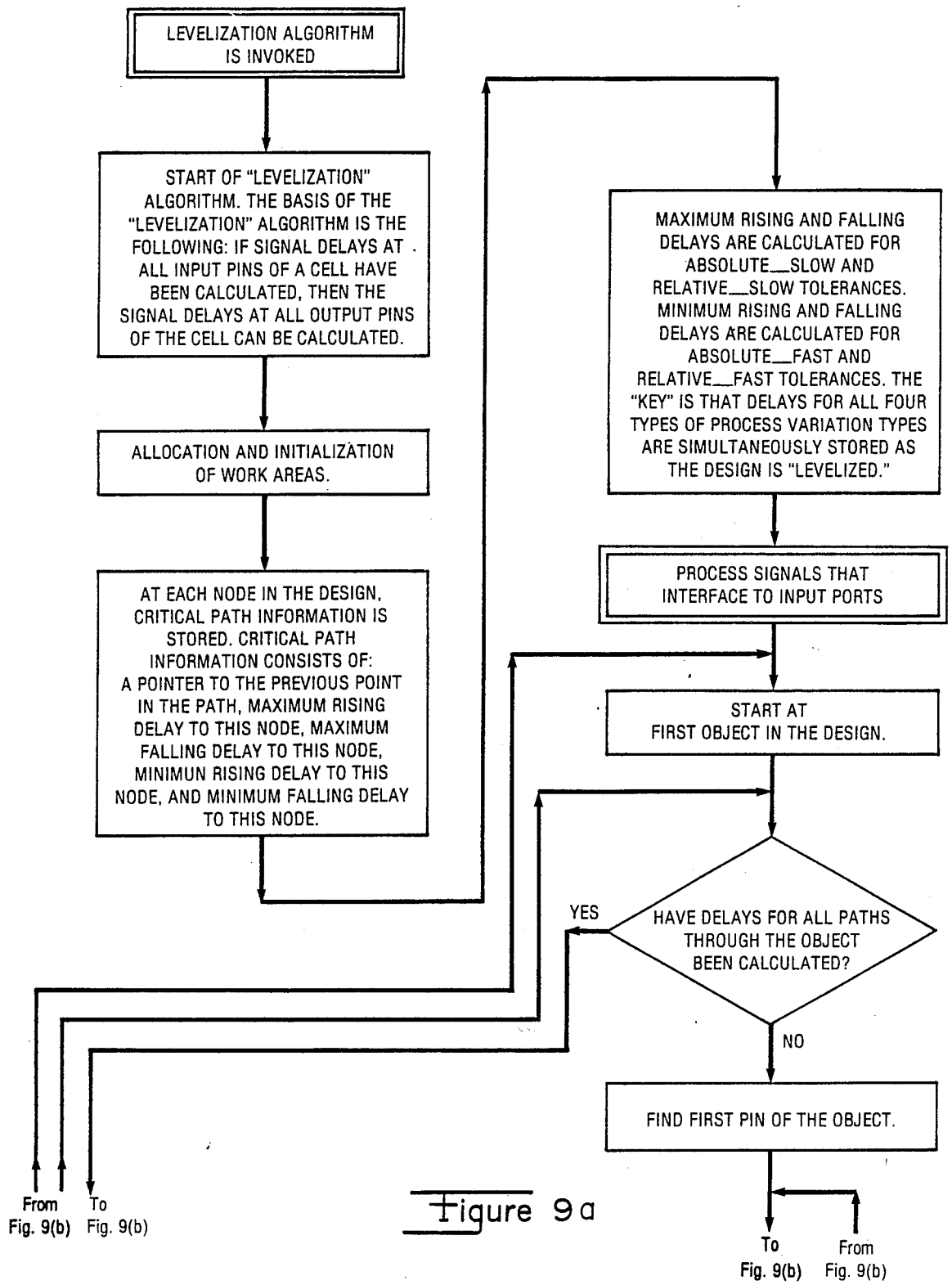

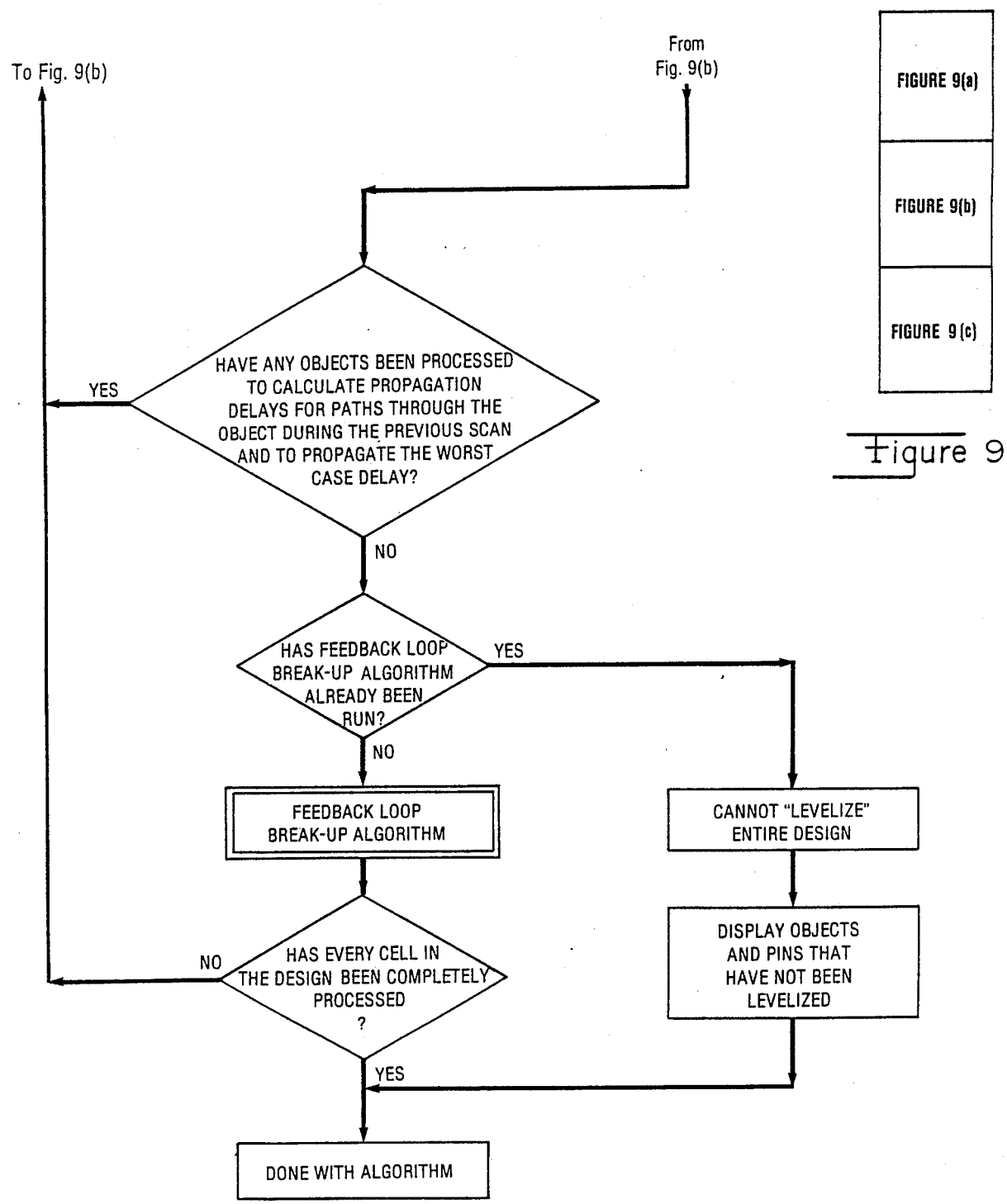

LONGEST PATH: 23.805 ns
TIMING HISTOGRAM—UNITS = NANOSECONDS

| UPPER BOUND | NUMBER OF PATHS |
|---|---|
| 0.000 | 0 |
| 1.000 | 0 |
| 2.000 | 0 |
| 3.000 | 0 |
| 4.000 | 0 |
| 5.000 | 2 ** |
| 6.000 | 0 |
| 7.000 | 0 |
| 8.000 | 4 **** |
| 9.000 | 1 * |
| 10.000 | 5 ***** |
| 11.000 | 1 * |
| 12.000 | 3 *** |
| 13.000 | 1 * |
| 14.000 | 3 *** |
| 15.000 | 1 * |
| 16.000 | 1 * |
| 17.000 | 4 **** |
| 18.000 | 2 ** |
| 19.000 | 1 * |
| 20.000 | 1 * |
| 21.000 | 0 |
| 22.000 | 0 |
| 23.000 | 1 * |
| 24.000 | 1 * |
| OVER 25.000 | 0 |

TOTAL SAMPLE SIZE 32

Figure 20

SINGLE CHIP SETUP TIMING ANALYSIS

SINGLE CHIP HOLD TIMING ANALYSIS

SETUP CHECKS

CASE 1—LONGER DELAY IN DATA PATH

CASE 2—LONGER DELAY IN CLOCK PATH

→ TIME

STATIC TIMING ANALYSIS OF SEMICONDUCTOR DIGITAL CIRCUITS

BACKGROUND OF THE INVENTION

Field of the Invention

This invention relates to logic circuit verification schemes and more particularly to schemes for analyzing time-oriented responses and signal delays through levels of proposed logic circuitry.

It is common practice to simulate a logic circuit prior to its fabrication in large-scale integrated circuitry. The logic circuitry can be conveniently modelled, modified and analyzed by computer prior to reducing the corrected circuitry to semiconductor processing techniques. The logic gates in a simulated logic circuit may be stimulated by applied signals to assure proper operation in accordance with the desired logic conditions. However, to assure proper operation of logic gates of the simulated logic circuitry, it is common to analyze signal delays over various paths to determine whether undesirable switching events are caused by signals that arrive at different times and appear as anomalous logic events which cause erroneous switching results.

Certain known simulators attempt to resolve timing errors by analyzing the operation of the simulated logic at time intervals substantially shorter than the normal clock-time operating intervals in order to identify dynamic conditions of signal delays and response times through the simulated logic that may be troublesome (see, for example, U.S. Pat. No. 4,527,249). Since only a minor portion of the gates in a typical logic circuit will change state in any given clock cycle, a substantial amount of testing is involved in these conventional schemes at sub-cycle operating intervals in order to identify the troublesome timing events. Other conventional timing analysis schemes simply accumulate the maximum or minimum delay values along a specified path for visual inspection.

Summary of Invention

In accordance with the present invention, a time verification scheme incorporates correction factors for variations of trigger levels and propagation delays through logic elements as functions of temperature and operating voltage, and incorporates signal loading factors into modeling techniques which contribute to accumulated successive signal delays through the levels of logic being proposed. In addition, tolerances associated with semiconductor processes are incorporated into the analysis techniques to provide indications of best-and worst-case operating condition of the proposed logic. Specifically, the time verification scheme of the present invention analyzes proposed design in consideration of the specifications of performance given by the selected semiconductor vendor to determine whether a design will provide correct results when fabricated using the selected process and operated at the frequency desired.

Each semiconductor vendor has specialized knowledge of the particular parameters of each of the vendors' product lines. This can be expressed as a statistical distribution over the many units produced on the vendor's manufacturing line. In particular, the typical delay or propagation time through a particular logic element can be expressed as a bell-shaped curve. For practical purposes it is considered that the curves touch the axis at the two extreme points of Absolute Fast (AF) and of Absolute Slow (AS) because the manufacturer will test chips and not ship any which are somehow outside those boundaries of acceptable performance.

This entire range of speed applies to the accumulated production of a process line over many days, batches, variations in raw material, and minor changes in the production process. It is extremely unlikely that on a single die produced on a common silicon substrate, that two implementations of a logic cell would be at the extremes of AF and AS. For chips that might demonstrate the Absolute Fast behavior, it is possible to predict statistically what the slowest extreme on that chip could be, and designate it the Relative Slow (RS) for those chips. Similarly, a chip with the Absolute Slow behavior would likely only exhibit a Relative Fast (RF) extreme.

Manufacturing tolerances between batches of chips, e.g. die produced from different ingots of raw material, would make it much more likely that the full range of delay distribution is possible, for example, on a printed circuit board containing several such chips. It is, however, too pessimistic to apply the best-and worst-case analyses to a circuit on a single silicon chip, as is presently done due to the limits of available techniques.

DESCRIPTION OF THE DRAWINGS

FIG. 6(f) is a chart of a typical print-out of data illustrating the long-path analyses of the arithmetic logic unit of FIGS. 6 and 6(a)–(e);

FIG. 6(g) is a chart of a typical print-out of data illustrating clock violations analyses of the arithmetic logic unit of FIGS. 6 and 6(a)–(e) when used in a synchronous design in which the arithmetic logic unit is surrounded by clocked D-flip-flops;

FIGS. 9(a) through (c) comprise a three part chart illustrating the logical flow of the levelization algorithm invoked in the subroutine of FIG. 7;

FIGS. 12 and 12(a) through (f) comprise a chart illustrating the logical flow through the subroutine of FIG. 9(c) for the feedback loop Break-Up algorithm.

FIG. 20 is a histogram of circuit-path delay calculations for the arithmetic logic unit in FIGS. 6 and 6(a) through (e) according to the present invention;

DESCRIPTION OF THE PREFERRED EMBODIMENT

Figure 1A:
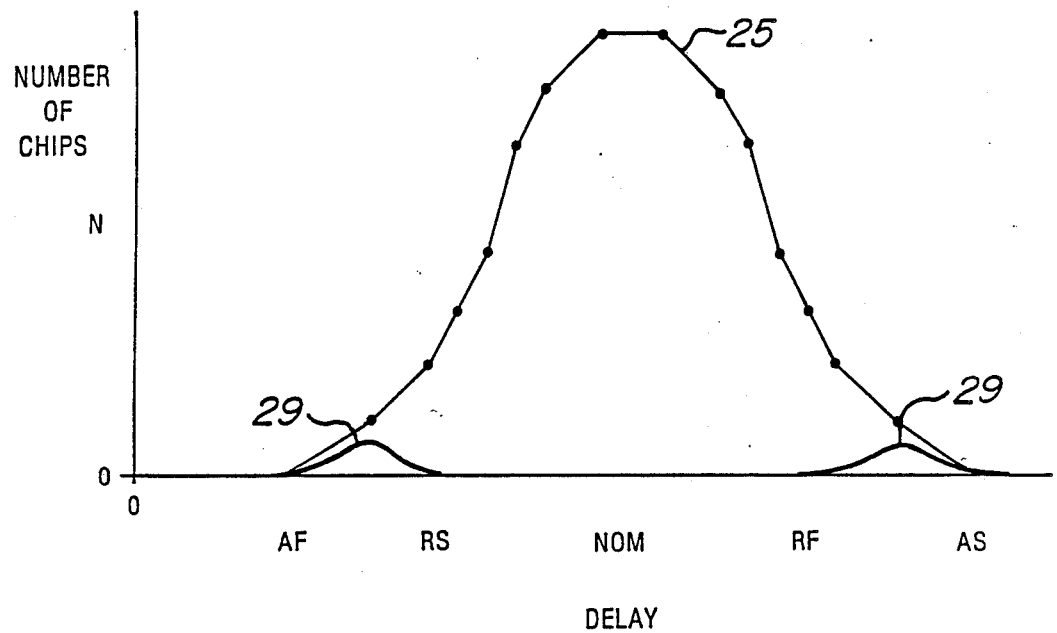
FIG. 1(a) is a graph illustrating the distribution of typical signal delays encountered through logic elements prepared by a given semiconductor manufacturing process, and encountered for specific integrated circuit chips fabricated by such process.

In general, the present invention accumulates the useful combinations of AF, RS, RF, and AS delay values, as illustrated in the graph of FIG. 1(a) more fully described below, to permit timing verifications that recognize the existence of manufacturing-tolerance variations within and among very large-scale integrated (VLSI) circuits. The information is supplied as coefficients for a delay-calculation equation by the silicon manufacturer in one form or another. One example would be as the nominal value and the factors by which to multiply to obtain each of the four parameters.

For each output pin of each logic element used in a proposed logic design under analysis, the present invention maintains a matrix of information as follows: There are four rows which correspond to the AF, RS, RF, and AS data types. There are two columns of pointer information and two columns of data information. One of each type of column is associated with the Transition Up (TU) and one of each type of column is associated with the Transition Down (TD) information. TU is the delay to the output of a cell when the output is switching from low to high. TD is the delay to the output of a cell when the output is switching from high to low.

TABLE 1

|    | TU      | TU   | TD      | TD   |
|----|---------|------|---------|------|
| AF | pointer | data | pointer | data |
| RS | pointer | data | pointer | data |
| RF | pointer | data | pointer | data |
| AS | pointer | data | pointer | data |

For each output of each logic element in the proposed logic design, the present invention identifies which input of the design would cause the longest or shortest delays for both a rising input signal as well as for a falling input signal. Thus, no input stimulus or simulation pattern is needed as this is not a "simulation". The pointer field of information indicates which input pin of the logic element is the signal that causes that type of path. The data field contains the actual cumulative delay to that point from the beginning of the path. A path is defined to start at the clock input of a D Flip-Flop (DFF) or an input pin of the design. Paths end either at the data input of a DFF or at an output pin of the design. There are only eight pointers and eight data fields for the last logic element or object in a path. The pointer field is used to rapidly back trace through the logic to pick out the path elements when printing out results, as later described herein.

In doing a SET-UP clock-violation check on a proposed design the accumulated delays of the RS row on the data input are compared with the accumulated delays of the AF row on the clock input of a DFF, and the accumulated delays of the AS row on the data input are compared with the accumulated delays of the RF row on the clock input of the DFF.

Figure 1B:
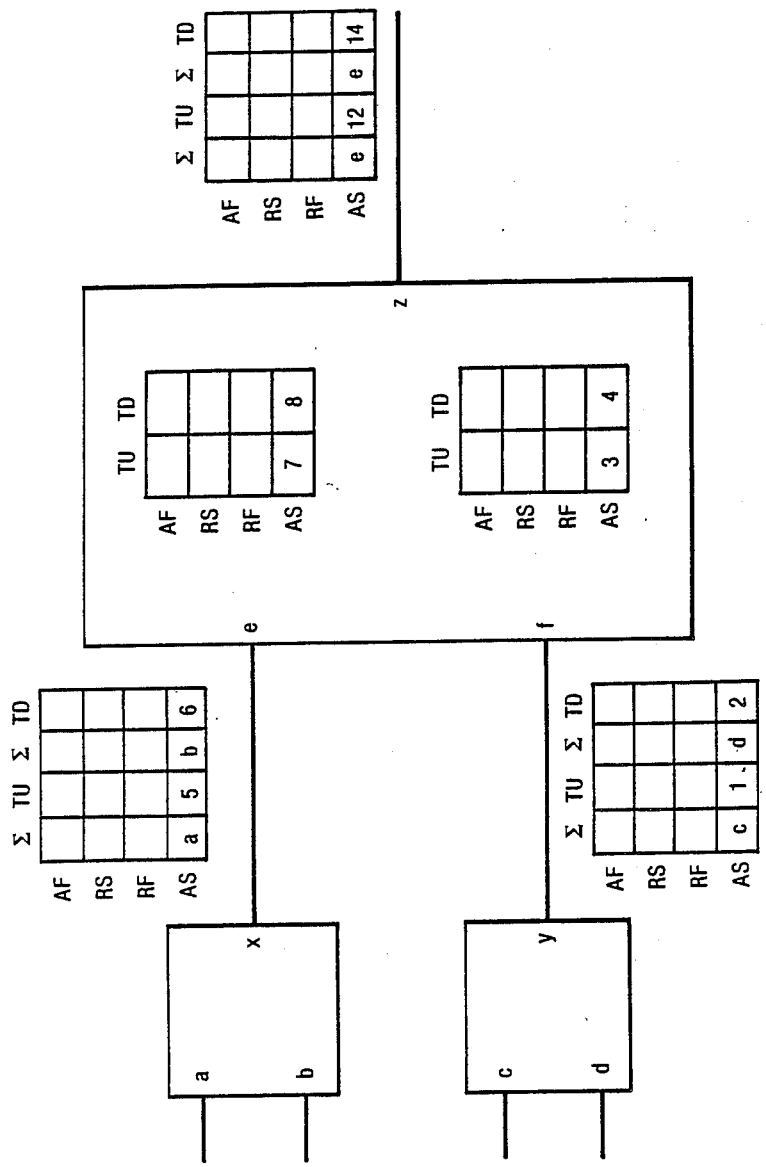
FIG. 1(b) is a block schematic diagram of a simple logic circuit illustrating the matrix of information of the type in Table 1 for each logic element.

Referring to FIG. 1(b), there is shown a simplified block schematic diagram of a logic circuit that contains only non-inverting logic elements or cells, e.g. AND gates but not any NAND gates. This restriction is removed in later descriptions herein. Based on the rise-time and fall-time for each input pin on each cell, and the loading on each output pin, the present invention calculates a matrix of delay values from every input pin to every output pin. Then, as the present invention accumulates these delay values, it adds the AS value for output y ($\Sigma$TU and $\Sigma$TD respectively) to the AS values for the f-z matrix. It also adds the AS values for output x to the AS values for the e-z matrix. Whichever is the slower number for $\Sigma$TU is stored with the path pointer (ex:e) into the z output matrix and whichever is the slower number for $\Sigma$TD is stored with the path pointer (ex:e) into the z output matrix as illustrated in FIG. 1(b).

Similarly, the RS values are added, compared and stored. For both AS and RS, the largest value is the item of interest. The pointer in the matrix indicates which of the input pins provided the data being aggregated, as indicated in FIG. 1(b).

The RF and AF values are each added, compared and stored with the objective of locating the smallest delay or quickest path. Mathematically, this can be thought of as a matrix addition where each row and each column is added to the corresponding element of the next matrix. However, in the present invention, the smallest number is selected for the rows RF and AF, while the largest number is selected for the row AS and RS. When the logic is inverting, then the previous positions $\Sigma$TU is added to the present positions TD to form the new $\Sigma$TD. Similarly, the previous positions $\Sigma$TD is added to the present positions TU to form the new ΣTU. In this manner, portions of the data are accumulated and portions are selectively discarded as data is calculated along the signal path.

Figure 2:
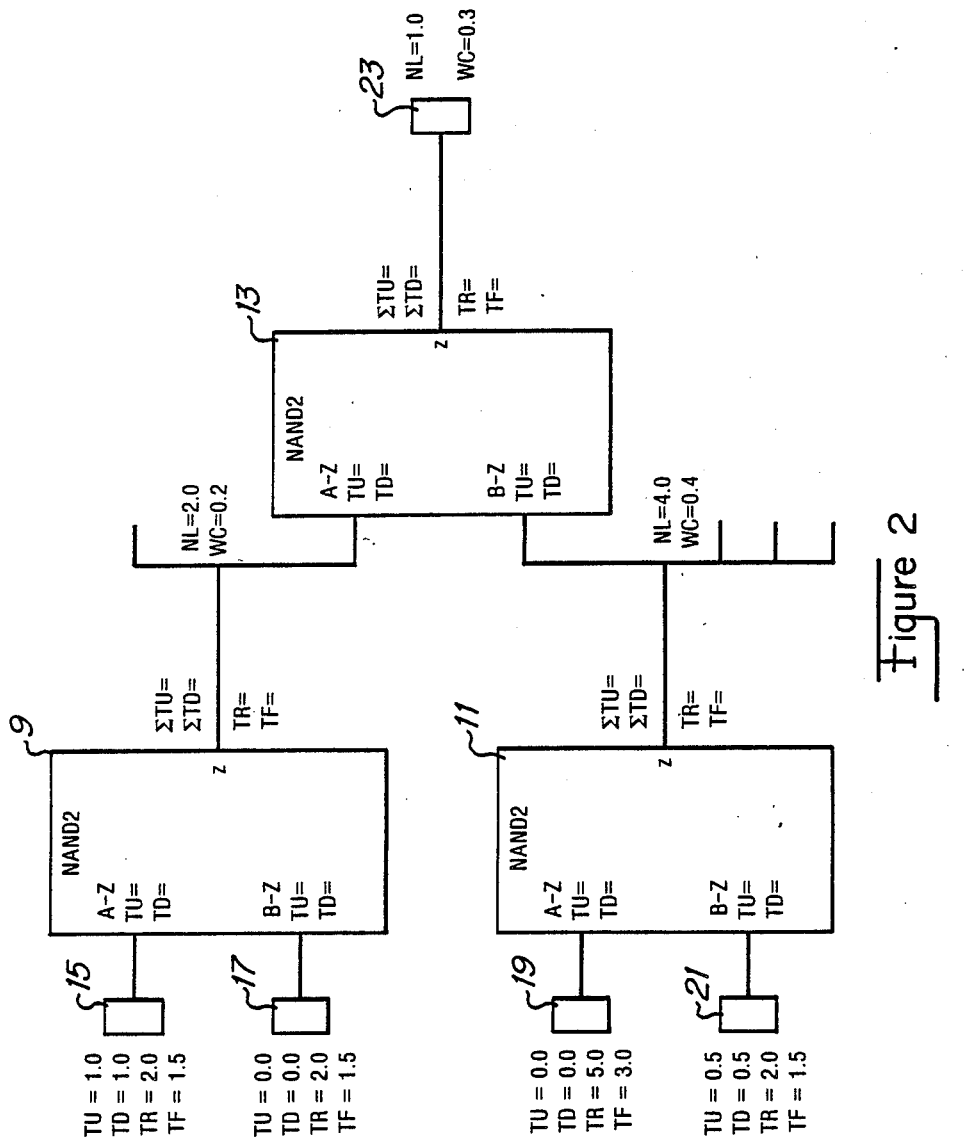
FIG. 2 is a block schematic diagram of a selected sub-network of proposed logic, listing the net loads and total wiring capacitance connected to each gate output and listing the accumulated propagation delay for rising signals and falling signals up to the inputs of the logic level.

Referring now to FIG. 2, there is shown a simplified segment of a proposed logic circuit including three NAND gates 9, 11, and 13 connected with other circuitry (not illustrated, for purposes of clarity) between input signal pads 15, 17, 19 and 21 and an output signal pad 23. Each NAND gate is illustrated as having an output Z and a pair of inputs A and B. At each output, there is shown the set of static parameters NL (net loads) and WC (wire capacitance) that are associated with such output and that are representative of factors that contribute to signal delays through the proposed logic.

Thus, the output of NAND gate 9 drives the input A of NAND gate 13 and another load (not shown) for a total of NL=2.0. In addition, this output has wiring capacitance (in picofarads) associated therewith for a total of WC=0.2. Similarly, the output of NAND gate 11 must drive the input B of NAND gate 13 and three other loads (not shown) for a total of NL=4.0 and WC=0.4. Also, the output of NAND gate 13, which is connected to a signal pad, is illustrated as having totals of NL=1.0 and WC=0.3. The net loads associated with the output of each gate are determined with reference to the 'net list' in memory that describes the logic being verified, and the wiring capacitance associated with each net being driven by an output is determined experimentally for the semiconductor structures that are formed by the processes to be used in producing the proposed logic.

Figure 3:
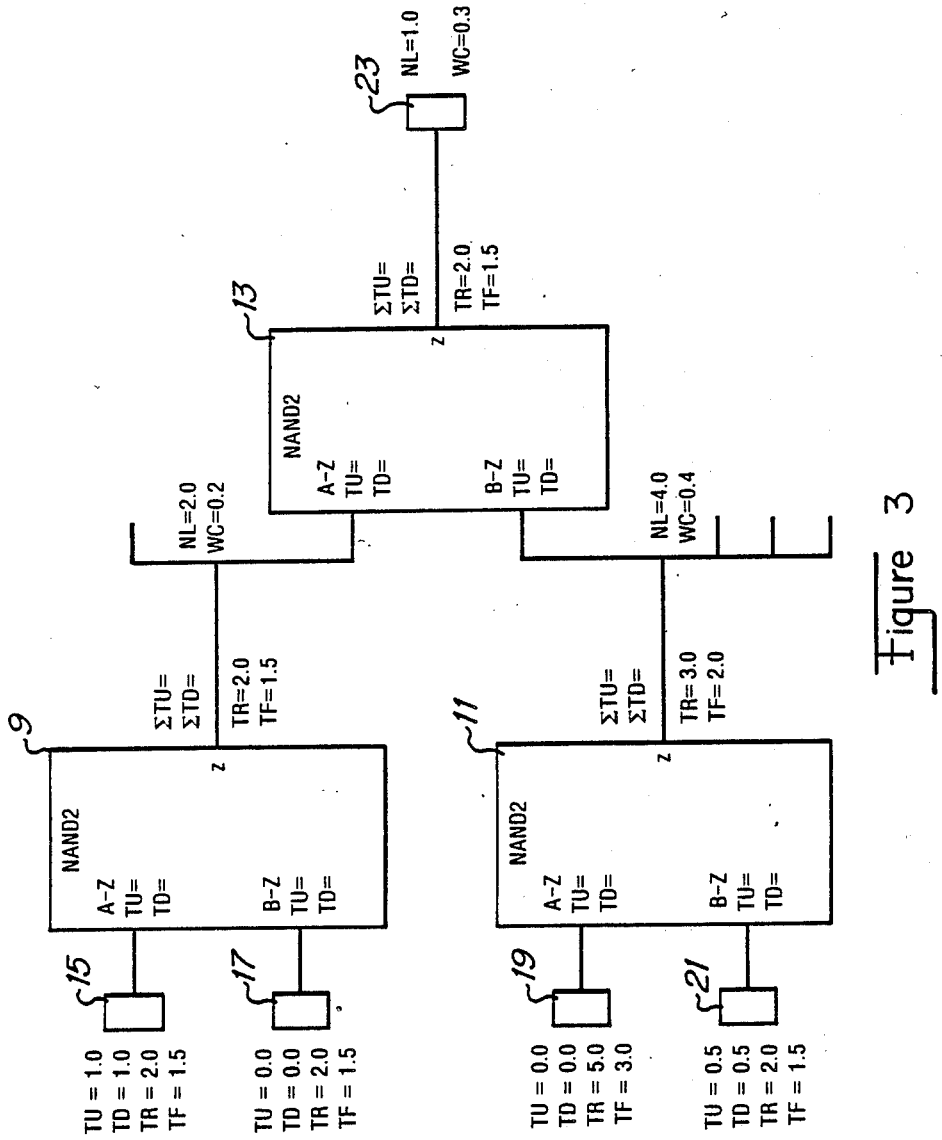
FIG. 3 is the block schematic diagram of FIG. 2 with the additional transition rise times and fall times of the logic gates.

This loading information is then used according to the present invention to determine the degradation of signalling speed at each logic level. Specifically, with reference to FIG. 3, there is shown the same logic as is illustrated in FIG. 2, with the additional set of dynamic parameters TR (rise time) and TF (fall time) now also associated with each logic gate output. The speed with which a gate of given logical type can switch its output between voltage levels is affected by net loading and wire capacitance in known manner such that rise times (TR) and fall times (TF) in nanoseconds lengthen with increases in NL and WC. Thus, in the circuit illustrated in FIGS. 2-5, and for the NL and WC associated with the output of gate 13, the rise time (TR) for switching the output of gate 13 between voltage levels is listed as TR=2.0, and the fall time (TF) for switching the output of gate 13 between voltage levels is listed as TF=1.5. Similarly, for each output of gates 9 and 11, and for the known parameters NL and WC associated therewith, the output rise times TR and TF can also be designated for each gate 9 and 11.

Figure 4:
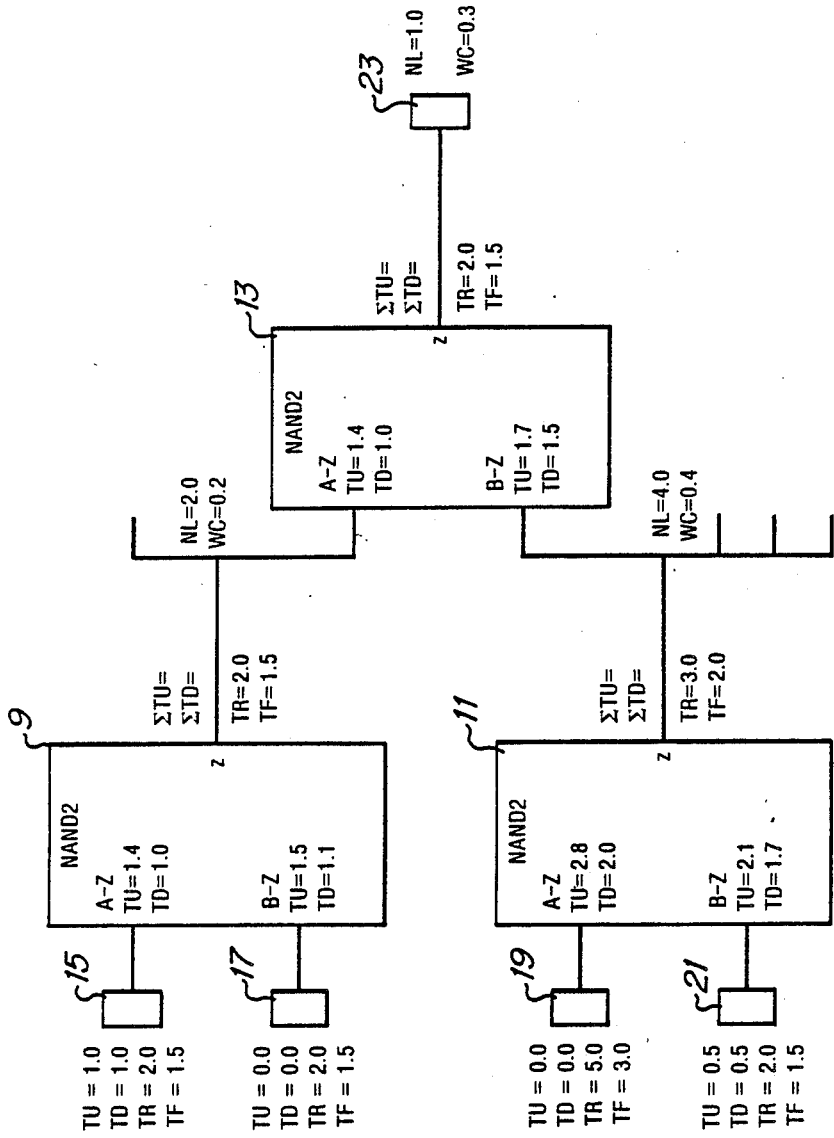
FIG. 4 is a block schematic diagram of FIG. 3 with additional propagation delays through each logic gate.
Figure 5:
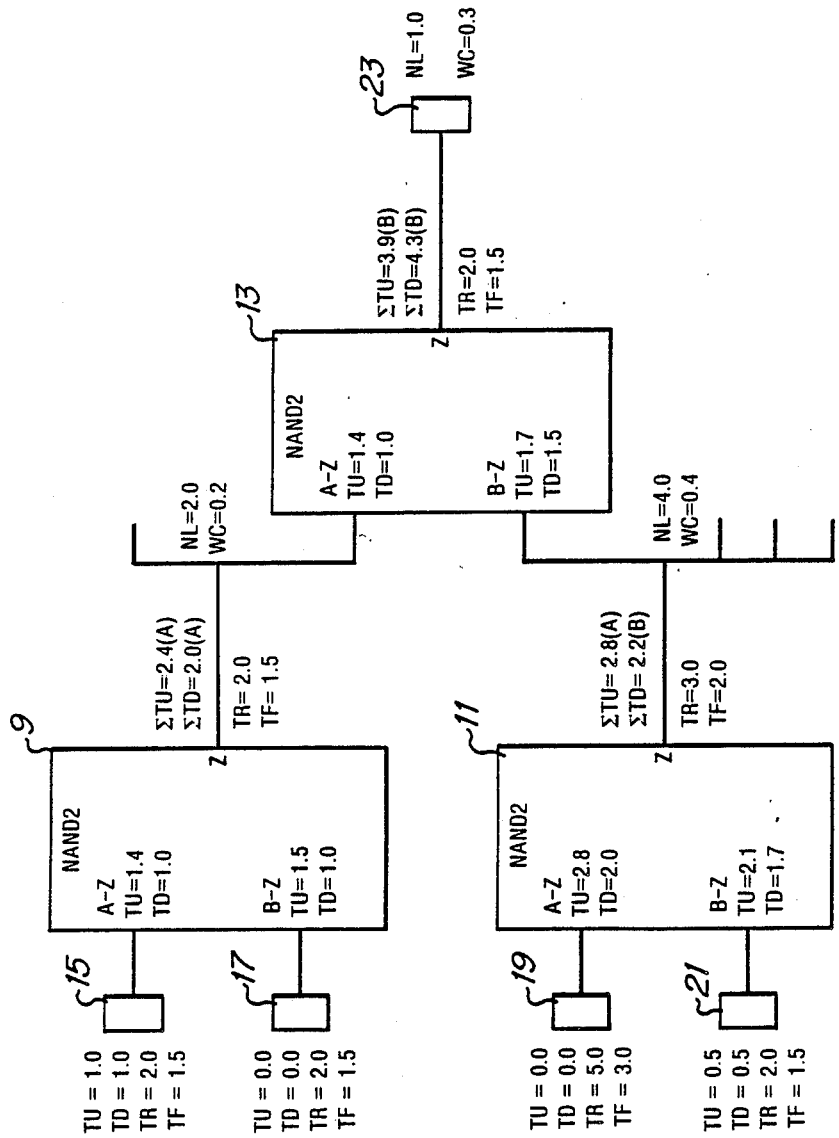
FIG. 5 is a block schematic diagram of FIG. 4 with additional accumulated propagation delays to the output of the sub-network.

Referring now to FIG. 4, there is shown the same logic with an additional set of parameters TU and TD that designate the rising signal propagation delay and falling signal propagation delay, respectively for each logic gate 9, 11, and 13. These parameters thus refer to the times required for input changes to effect corresponding output changes. These TU and TD parameters are calculated from a delay equation that uses the input transition time (TR and TF) from the net at the input of the gate and the output loading (NL and WC) from the net at the output of the gate to determine the gate delay. Specifically, each type of logic gate is known to respond to applied logic signals in certain transmission or propagation times (differently) for rising signals (TU) and for falling signals (TD). These parameters may be generated using conventional SPICE simulation programs, or the like, which provide accurate representations of the propagation delays that will be encountered in actual silicon circuit configurations. SPICE is a circuit analysis program that is commonly used in the industry and was created at the University of California, Berkeley. These parameters for each type of logic gate of certain circuit configuration are then stored in memory as additional information associated with each gate in the logic. Thus, for the logic illustrated in FIG. 4, the TU and TD parameters can be listed for each gate 9, 11, and 13 (and for each input-to-output path) in the logic. And; the conditions of signal delays TR, TF, TU and TD associated with signal propagation through the levels of logic up to the inputs (say, 15, 17, 19 and 21) at any logic level can all be listed for Worst-Case conditions, as illustrated in FIG. 5. There, the delays (for unspecified reasons in this example) up to the inputs 15, 17, 19 and 21 are independently specified by the TU, TD, TR and TF parameters, and these parameters may now be combined to provide indication of the overall switching time delays ΣTU and ΣTD through the proposed logic. Thus, accumulated Worst-Case conditions of switching time TU for NAND gate 9 to the output thereof is ΣTU=2.4 (via input A), and for NAND gate 11 to the output thereof is ΣTU=2.8 (via input A). Also, the Worst-Case ΣTD for NAND gate 9 to the output thereof is ΣTD=2.0 (via input A), and for NAND gate 11 is ΣTD=2.2 (via input B). Similarly, the Worst-Case conditions accumulated through NAND gate 13 in the next logic level are ΣTU=3.9 (via input B) and ΣTD=4.3 (via input B). It is also possible to accumulate minimum response time, or Best-Case operating conditions (not shown) for each input to output of a gate in order to establish a range of operating delays along selected signal paths through the successive levels of the proposed logic. Such range of Best-Case to Worst-Case operating conditions provides basis for determining whether the proposed logic circuitry will operate properly when formed within certain manufacturing tolerances in accordance with selected silicon processing technology.

Referring again to the graph of FIG. 1(a), there is shown a Gaussian curve 25 of the spread over a number of circuits of the tolerances in circuit delays attributable to variations in actual silicon processes during the manufacturing of large-scale integrated circuits. On a relative scale of typical delay times along the horizontal axis, there is shown a distribution of delays encountered in manufactured logic gates from the absolute fastest (AF) to the absolute slowest (AS), with the bulk of circuit delays for a given manufacturing process occurring about the median or NOMinal range. In addition, logic gates in a particular circuit chip manufactured by such processes may be expected to have a narrower distribution of circuit delays, as illustrated by curves 27 and 29. Thus, on a given chip, circuit delays may be distributed per curve 27 over a narrower band of tolerances from absolute fastest (AF) to relatively slowest (RS) in the Best-Case conditions of manufacturing, or may be distributed per curve 29 over the narrow band of tolerances from the relative fastest (RF) to the absolute slowest (AS) in the Worst-Case conditions of manufacturing. Thus, it is highly improbable that logic gates formed on a given chip will have delays ranging over the extreme limits of curve 25 for the manufacturing process in general, but rather will more likely have delays over a narrower range such as 27 or 29 for a specific chip manufactured by the process. The same chip design manufactured at a different time may exhibit gate delays in a different part of the overall range for the same manufacturing process, and it is therefore desirable in accordance with the present invention to calculate and accumulate information about circuit delays associated with four process variations (absolute fast, relative slow, relative fast, and absolute slow) simultaneously through the successive logic levels being proposed in order to determine whether the logic will operate properly when manufactured in silicon by the designated process for which the timing information for individual types of logic elements was stored.

In addition to accumulating timing delays through successive levels of proposed logic for analysis with reference to manufacturing variations, the present invention also accounts for variations in operating temperature and power supply voltage by altering the stored parameters as functions of voltage and temperature. Thus, the rise time parameter TR is first adjusted according to the following equation:

$$TR = RTR + LTR \cdot NL + WTR \cdot WC \qquad (Eq. 1)$$

where RTR is the raw transition rise-time;

LTR is the load transition rise-time factor, multiplied by the number of loads; and WTR is the wiring transition rise-time factor, multiplied by the total wire capacitance.

Similarly, the fall-time parameter TF is first adjusted according to the following equation:

$$TF = RTF + LTF \cdot NL + WTF \cdot WC \qquad (Eq. 2)$$

where RTF is the raw transition fall-time;

LTF is the load transition fall-time factor, multiplied by the number of loads; and WTF is the wiring transition fall-time factor, multiplied by the total wire capacitance.

These rise-time and fall-time equations 1 and 2 are then altered for temperature and voltage according to the following equation:

$$TX = TXl \cdot (1 + TXC \cdot DT) \cdot (1 + PXC \cdot DV) \qquad (Eq. 3)$$

where the X throughout is R (rise) or F (fall);

TXl is the computed output transition time derived from Eq. 1 or 2 under nominal conditions;

TXC is the temperature transition coefficient;

DT is the difference between the nominal specification temperature and the actual operating temperature;

PXC is the power transition coefficient; and

DV is the difference between the nominal specification voltage and the actual operating voltage.

The propagation delays TU and TD of logic gates being proposed are adjusted in accordance with the present invention for loading and wire capacitance according to the following equations:

$$TU = RDU + DFU \cdot TX + (LDU + (LFU \cdot TX)) \cdot NL + (WDU + (WFU \cdot TX)) \cdot WC \qquad (Eq. 4)$$

and $$TD = RDD + DFD \cdot TX + (LDD + (LFD \cdot TX)) \cdot NL + (WDD + (WFD \cdot TX)) \cdot WC \qquad (Eq. 5)$$

where RDU is the raw delay (up) for output rising;

DFU is the delay transition factor (up) for output rising;

LDU is the (up) delay loading factor for output rising;

LFU is the (up) delay transition loading factor for output rising;

WDU is the wire delay loading factor (up) for output rising;

WFU is the wire loading transition delay factor (up) for output rising;

RDD is the raw delay (down) for output falling;

DFD is the delay transition factor (down) for output falling;

LDD is the (down) delay loading factor for output falling;

LFD is the (down) delay transition loading factor for output falling;

WDD is the wire delay loading factor (down) for output falling; and

WFD is the wire loading transition delay factor (down) for output falling.

The above parameters are available from the semiconductor manufacturer and are stored in timing libraries in the host computer.

TX is the input transition time (TR or TF) obtained from Eq. 3 for the output of the previous gate;

NL is the net loads on the output of the gate;

WC is the wiring capacitance on the output of the gate.

The signal propagation is altered for temperature and voltage according to the following equation:

$$TP = TPl \cdot (1 + TDC \cdot DT) \cdot (1 + PDC \cdot DV) \qquad (Eq. 6)$$

where the P throughout is U or D;

TPl is the computed propagation delay (TU or TD) at nominal conditions from Eq. 4 and Eq. 5;

TDC is the temperature delay coefficient;

DT is the difference between the nominal specification temperature and the actual operating temperature;

PDC is the power delay coefficient; and

DV is the difference between the nominal specification voltage and the actual operating voltage.

The values of parameters TU and TD provided in accordance with Equations 4, 5 and 6 are stored in memory with the associated correction factors for voltage and temperature, as are the parameter values indicated in FIGS. 2 through 5 that are accumulated through the successive levels of the proposed logic. The operating timing relationships among gates in the proposed logic may then be accumulated and analyzed by:

1. Calculating the TR and TF for each network based upon:
   (a) the gate type involved;
   (b) the loading factors on each gate (net loads);
   (c) total wiring capacitance at the output;
   (d) the operating temperature; and
   (e) the operating voltage.

2. Calculating the gate delay for each input-output path based upon:
   (a) the gate type involved;
   (b) the gate input-output path parameters;
   (c) the input TR and TF;
   (d) the loading factors on each gate (net loads);
   (e) the total wiring capacitance at the output;
   (f) the operating temperature; and
   (g) the operating voltage. Then:

3. Tracing all signal paths through the proposed logic keeping track of the maximum and minimum delays in each network.

The timing verification scheme of the present invention supports process variations (i.e., manufacturing tolerances) by using delay variations expressed as percentage values describing how much variation AF (absolute fast), AS (absolute slow), RF (relative fast), and RS (relative slow) delays apply to the values stored in the timing libraries. These percentage variations are stored in the configuration files which can also specify operating temperatures and power-supply voltage for the proposed logic design, as discussed above. Thus, the timing verification scheme of the present invention multiplies the delay equation values (TU and TD) by the four tolerance values (AF, RS, RF, AS) from a configuration file to get the eight delay values used in the path analysis. A typical example of configuration files is illustrated in Table 2 below:

TABLE 2

| TECHNOLOGY | | | | |
|---|---|---|---|---|
| | AF | RS | RF | AS |
| CMOS | 0.5 | 0.6 | 1.4 | 1.5 |
| Chip designation | | Temp | Volts | |
| 1 | | 50.0 | 4.75 | |
| 2 | | 35.0 | 5.25 | |

The entries in the AF, RS, RF and AS columns represent the process-variation percentage values, discussed above.

The absolute fast (or, absolute slow) process variation means that absolute minimum (or, maximum) delays are obtained for the designated gate path by multiplying the delays by the listed AF (or, AS) process-variation value. Similarly, relative fast (or, relative slow) process variation means that minimum (or, maximum) delays relative to absolute maximum (or, minimum) delays are obtained for the designated gate path by multiplying the delays by the listed RF (RS) process-variation value. A process-variation value of 150% is listed as 1.5, 50% is listed as 0.5, and so on.

The CHIPS designation in the temperature and voltage section of Table 2 serves to override the nominal or default values of parameters described with reference to equations 1-6, above, to calculate applicable propagation delay parameters for the temperatures and voltages specified. Of course, a user may store several timing libraries, each containing the numerical values for each parameter needed to calculate the path delays in a circuit, for the technologies of interest (e.g., TTL, CMOS, etc.). Also, separate timing libraries may be created and stored for different manufacturing processes employed by different vendors.

Figure 6:
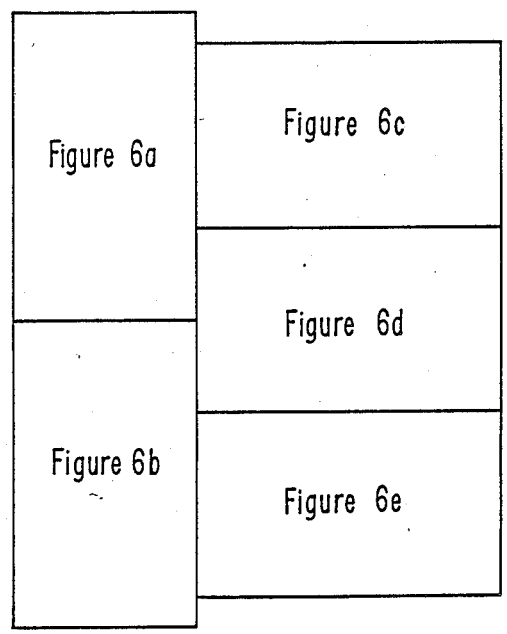
FIGS. 6 and 6(a) through 6(e) comprise a schematic diagram of an arithmetic logic unit proposed for fabrication as an integrated circuit.
Figure 6A:
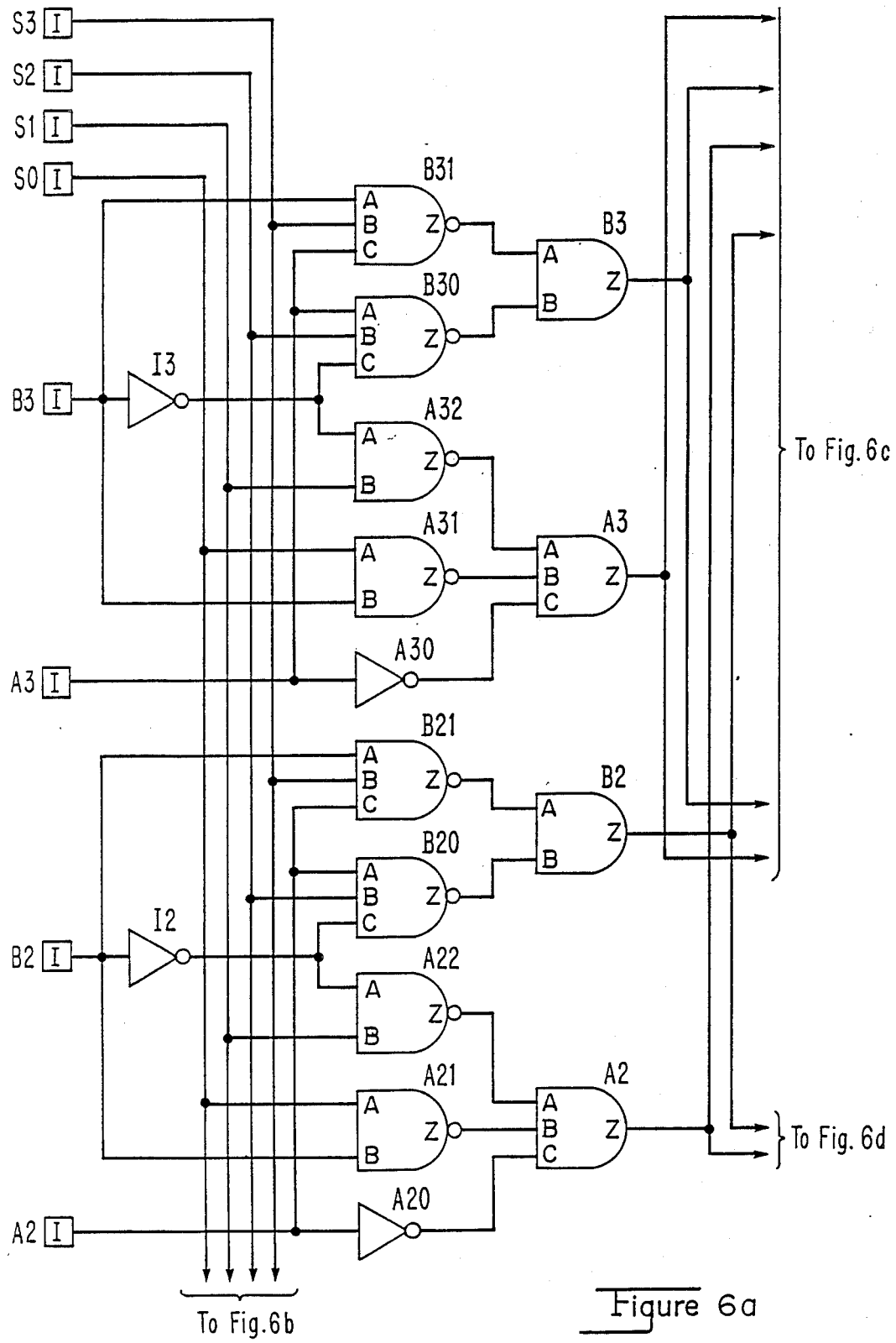
Figure 6B:
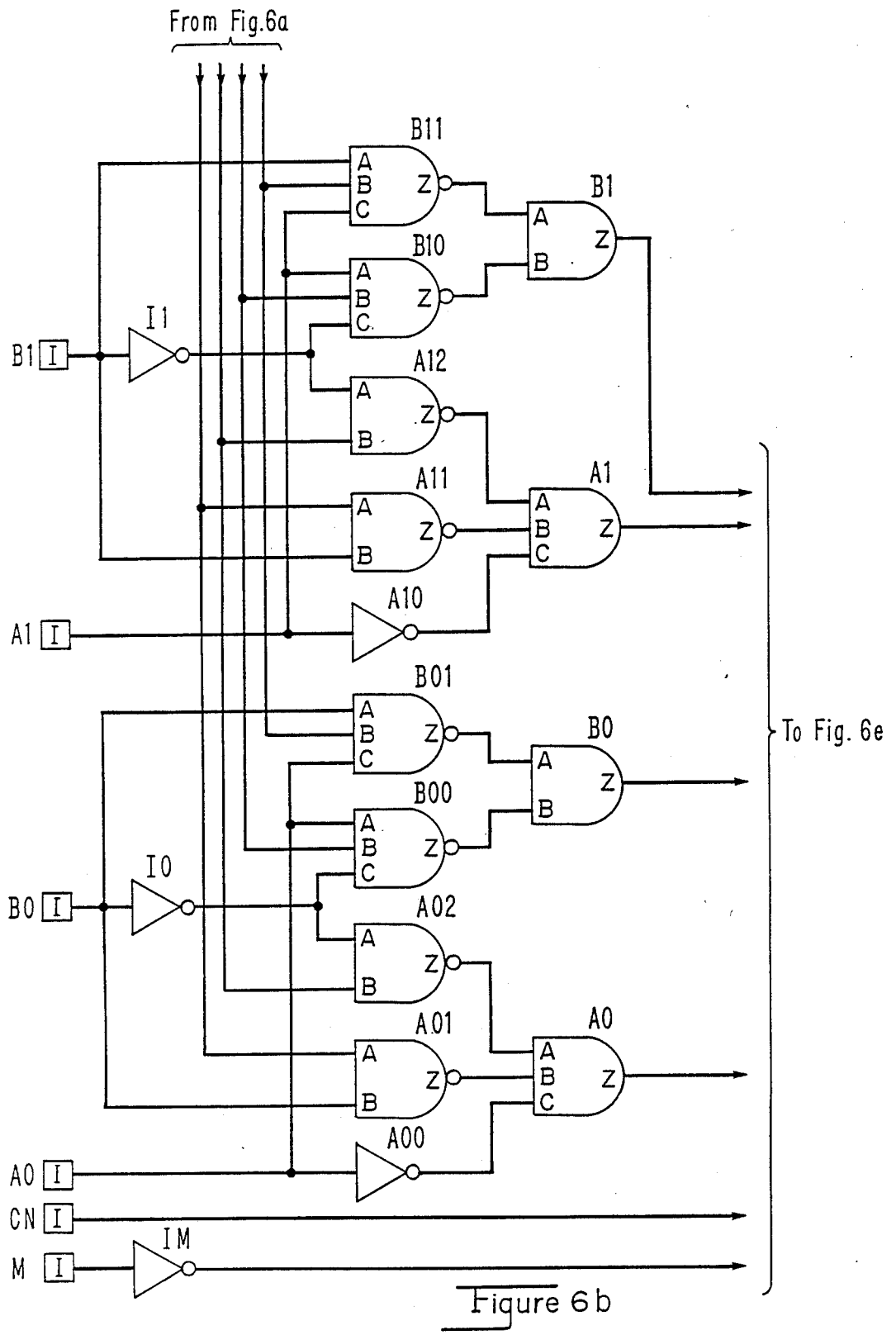

Referring now to FIG. 6(a), there is shown a schematic diagram of a typical logic circuit, for example, an arithmetic logic unit (ALU) including multiple gates and drivers and interconnecting conductor paths that can be analyzed according to the present invention. Thus, propagation delays may be accumulated in the manner previously described with respect to FIGS. 2 through 5 to provide an output indication of a selected parameter such as the long paths through the circuit (maximum delays) in the form illustrated in the chart of FIG. 6(b). This chart provides information about the tested circuit in the form of a designation of the device (ALU 4), the step delays (under TU and TD), the output transistions (under TR and TF), the cumulative delays, the loads, the wiring capacitance, and the identification of the designated logic gates in the path (typically extending over two lines in the chart for each gate). It should be noted that information calculated and illustrated in this manner according to the present invention facilitates rapid identification of design deficiencies, for example, as illustrated by the data entries appearing on the seventh and eighth lines. There, it is apparent that the identified gate which has 8 loads being driven significantly contributes wiring capacitance and long-path transition times and cumulative delays on rising and falling signals. Such information enables a circuit designer to pinpoint undesirable features in the proposed logic design that can be corrected before the design is fabricated for testing as an integrated circuit.

Figure 7:
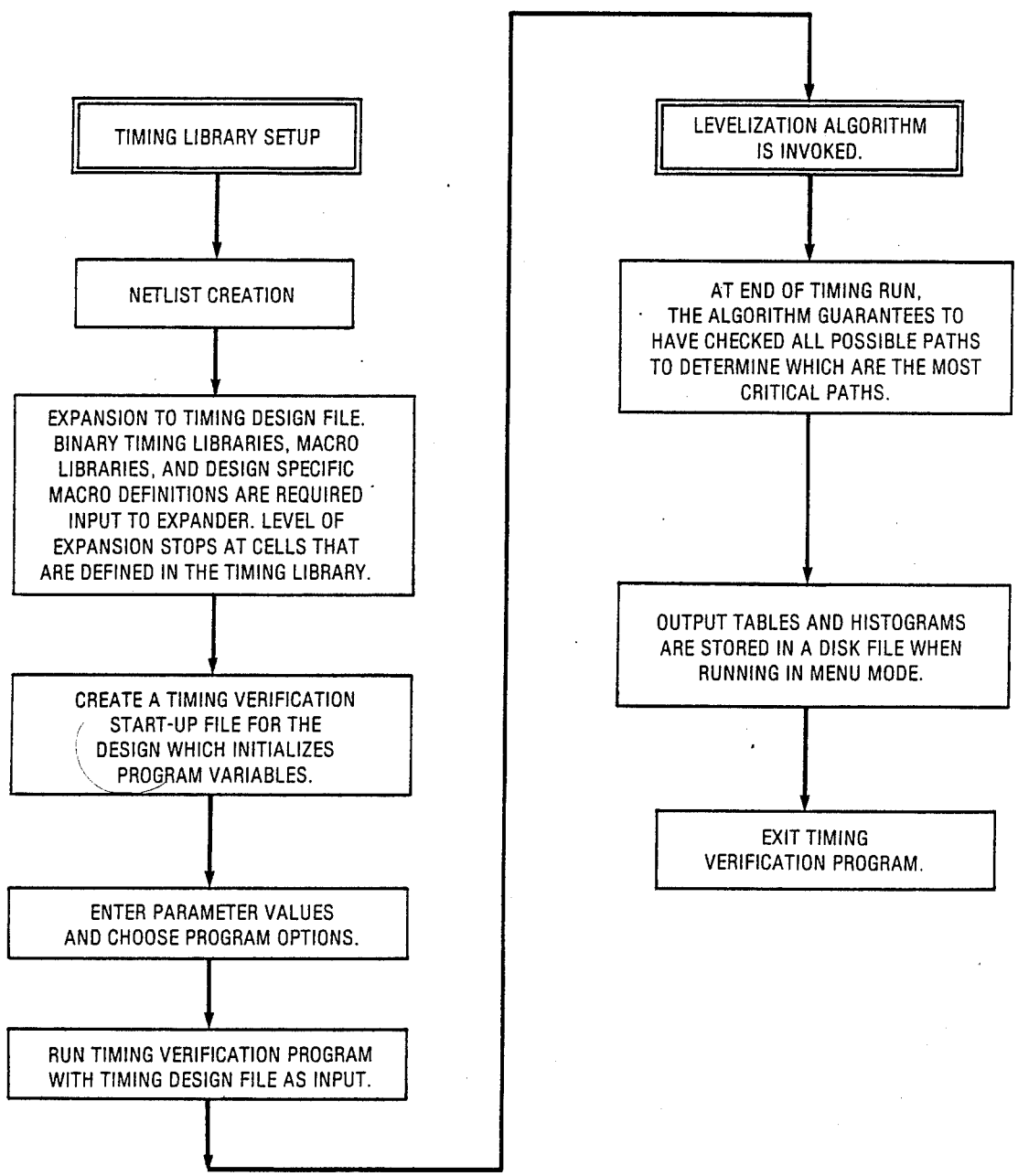
FIG. 7 is a chart illustrating the logical flow through the time verification routine of the present invention.
Figure 8:
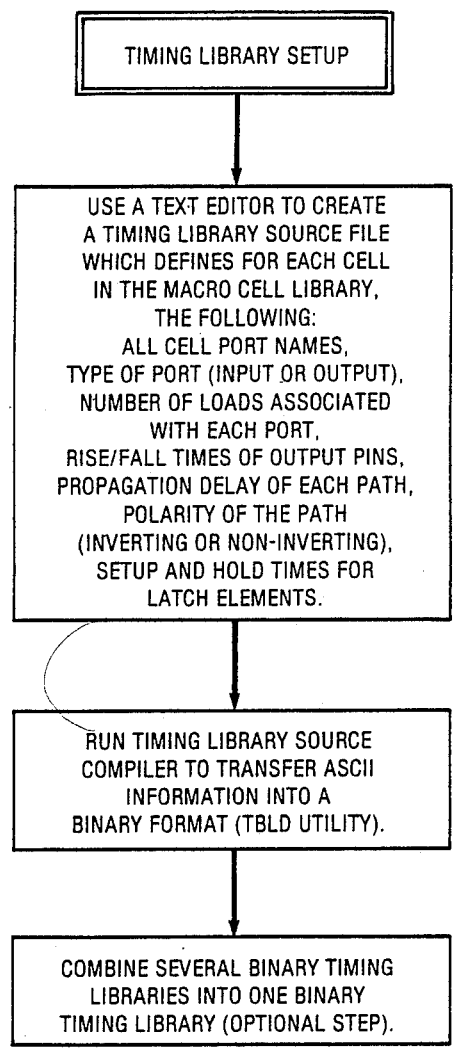
FIG. 8 is a chart illustrating the logical flow of setting up the timing library as needed in the subroutine of FIG. 7.
Figure 9B:
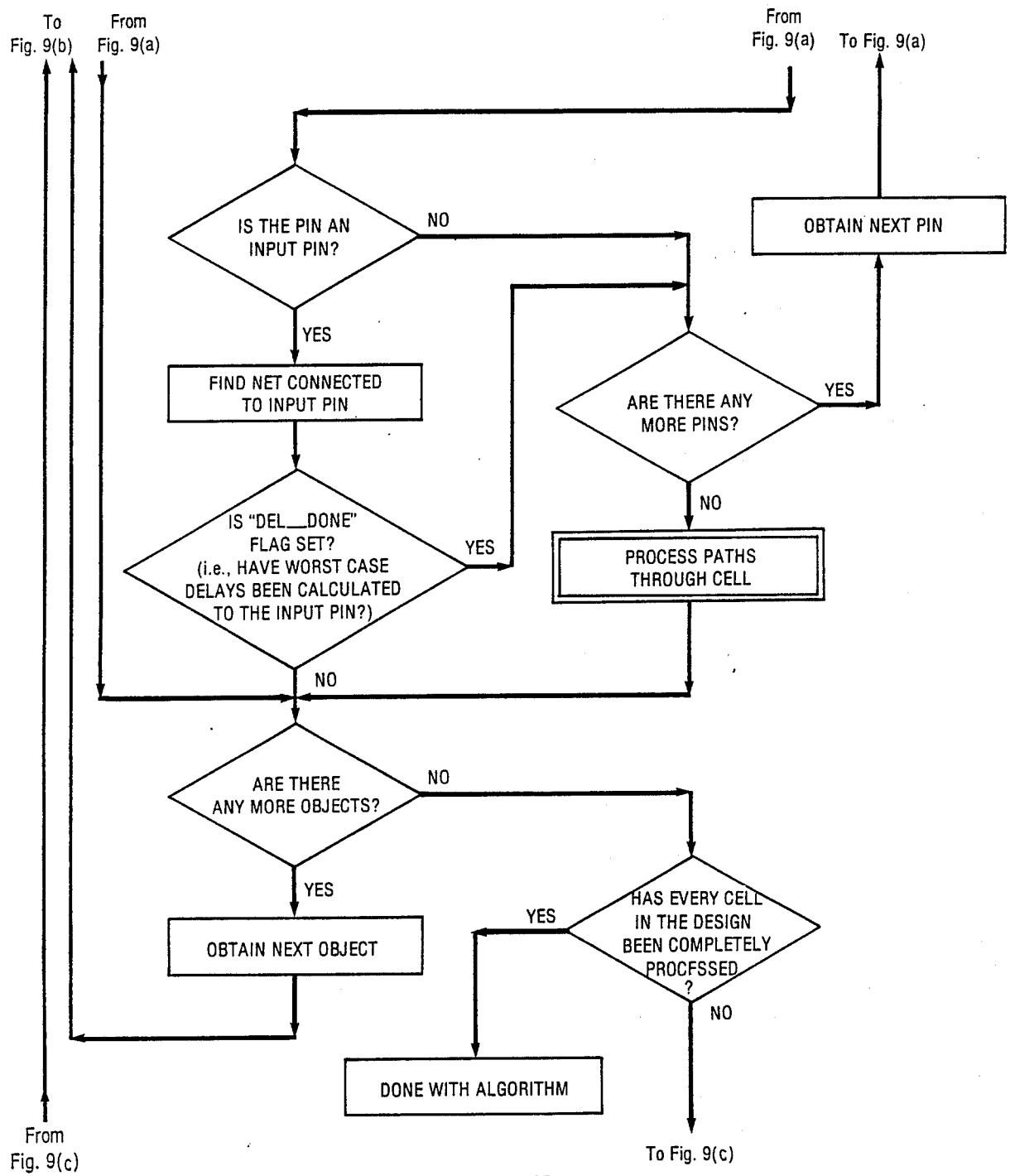
Figure 10:
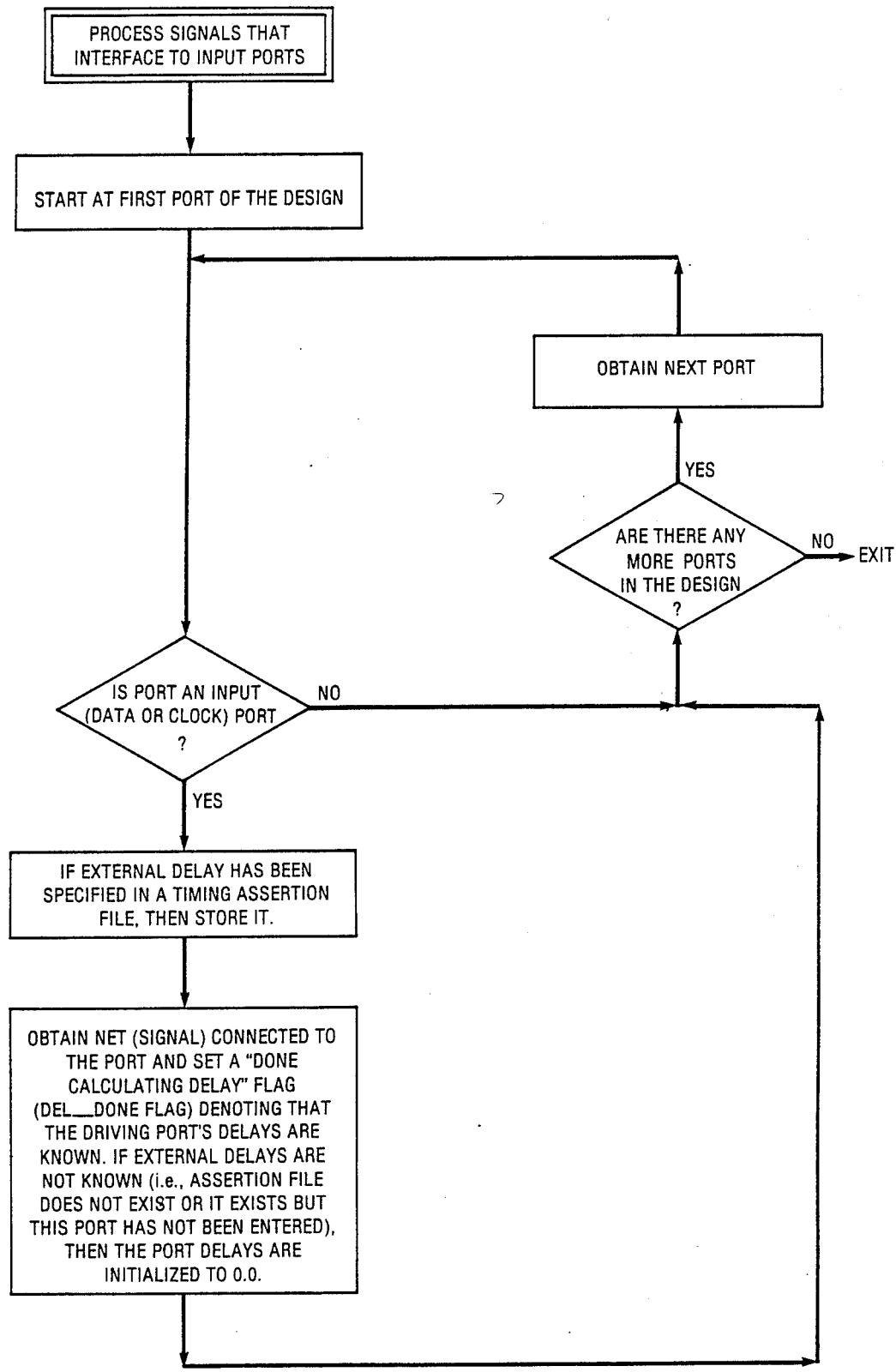
FIG. 10 is a chart illustrating the logical flow of processing signals that interface to input ports, invoked in FIG. 9(a)
Figure 11:
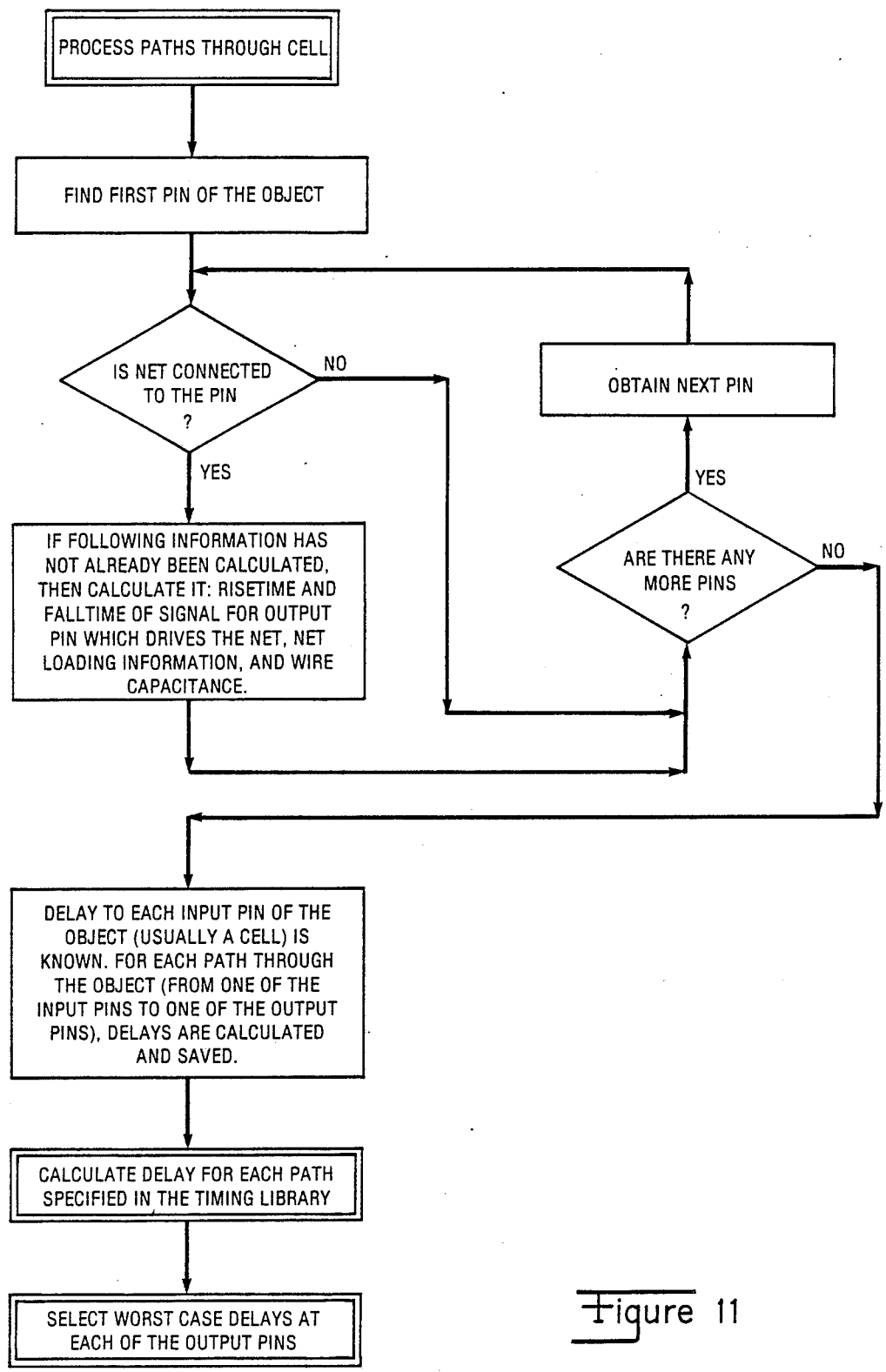
FIG. 11 is a chart illustrating the detailed flow through the subroutine of FIG. 9(b) to process the paths through a cell.
Figure 12A:
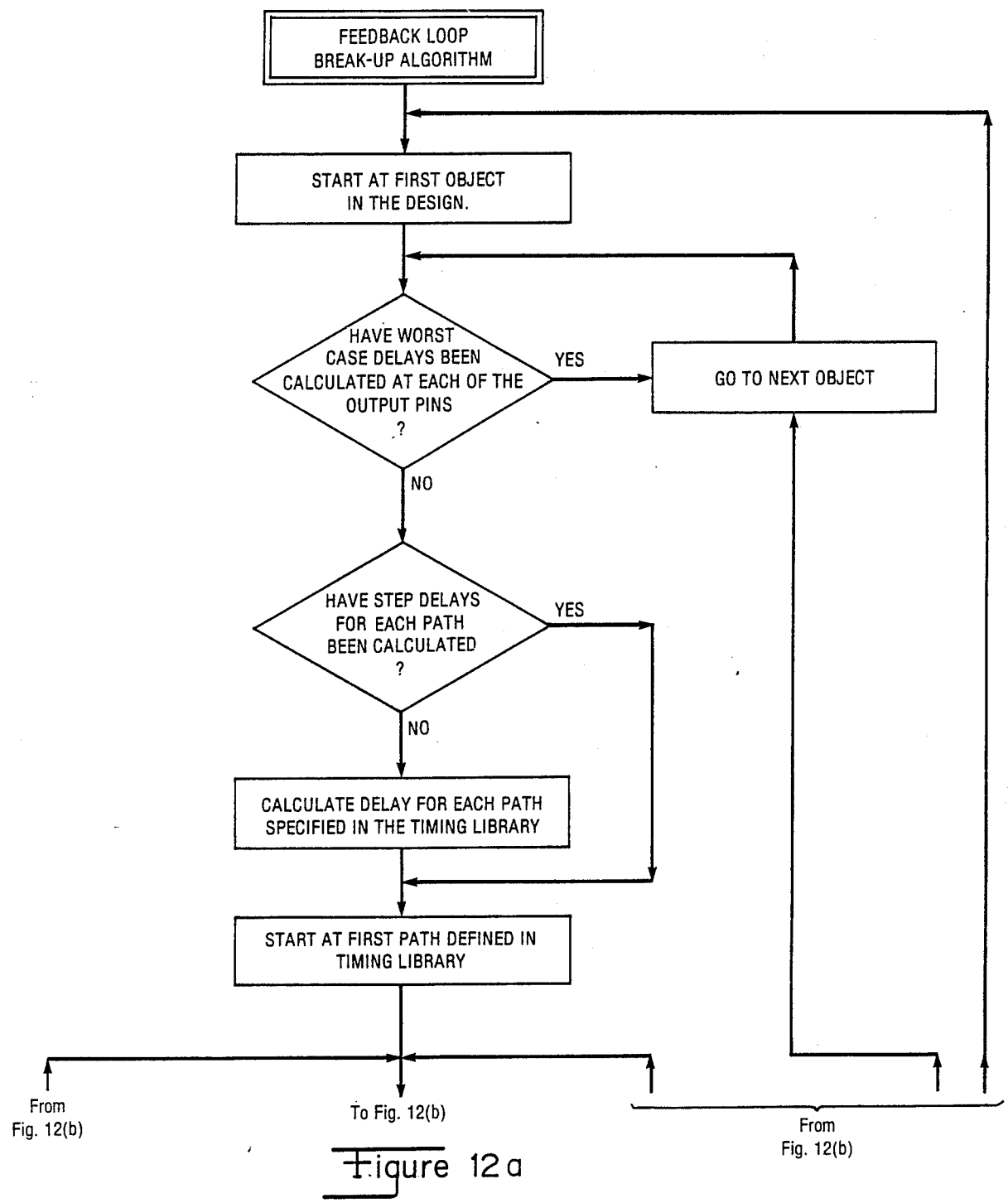
Figure 12:
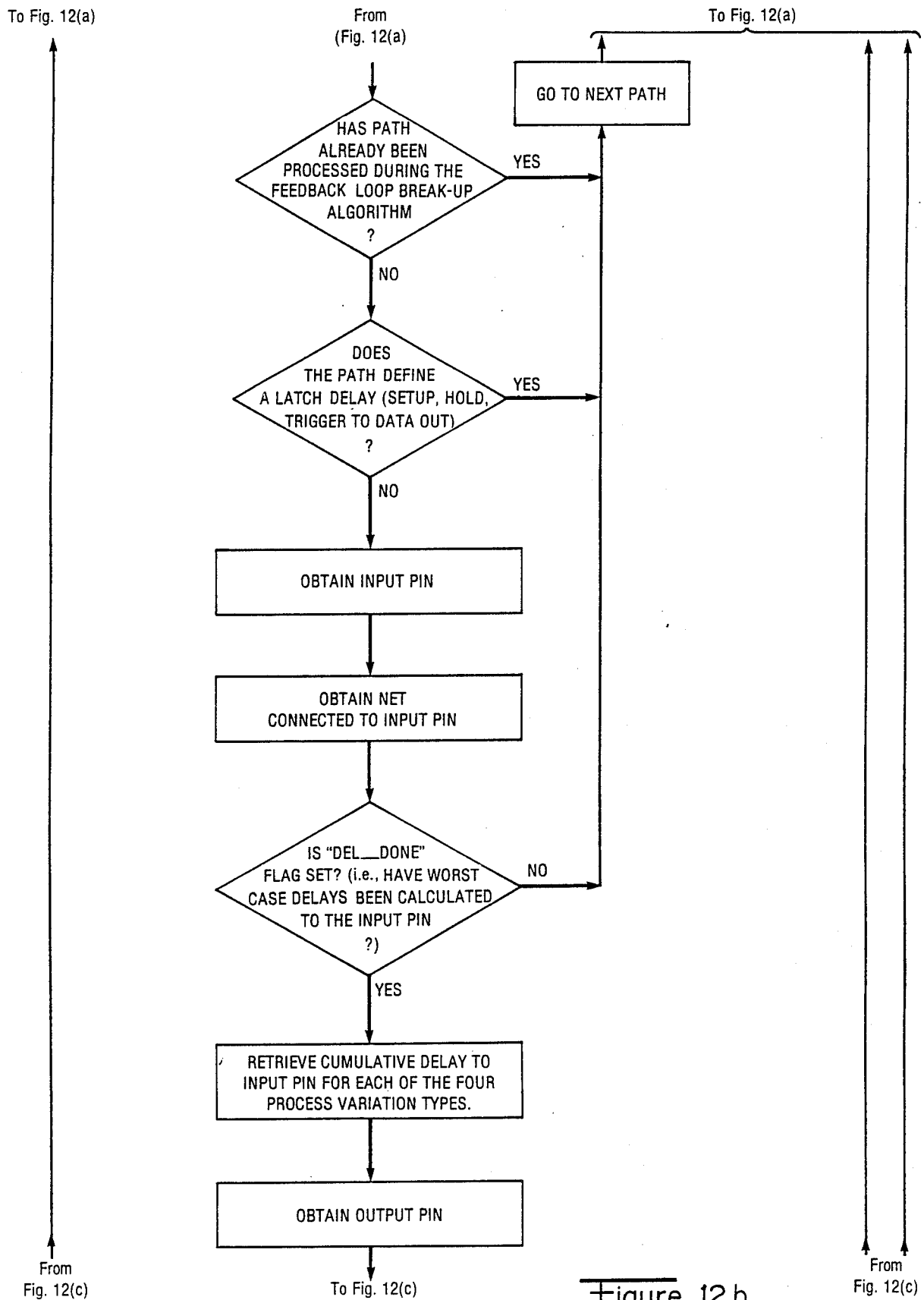
Figure 12C:
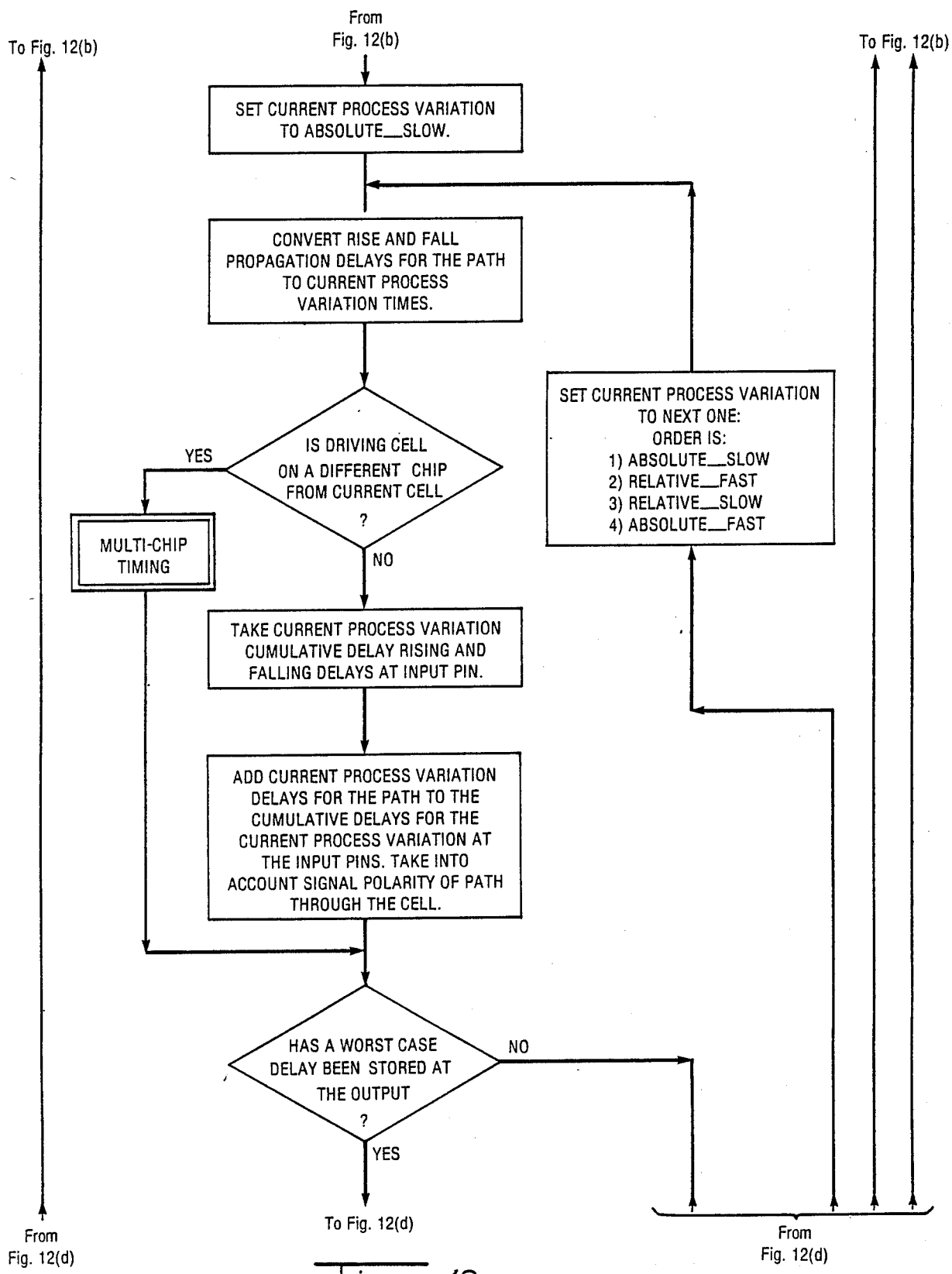
Figure 12D:
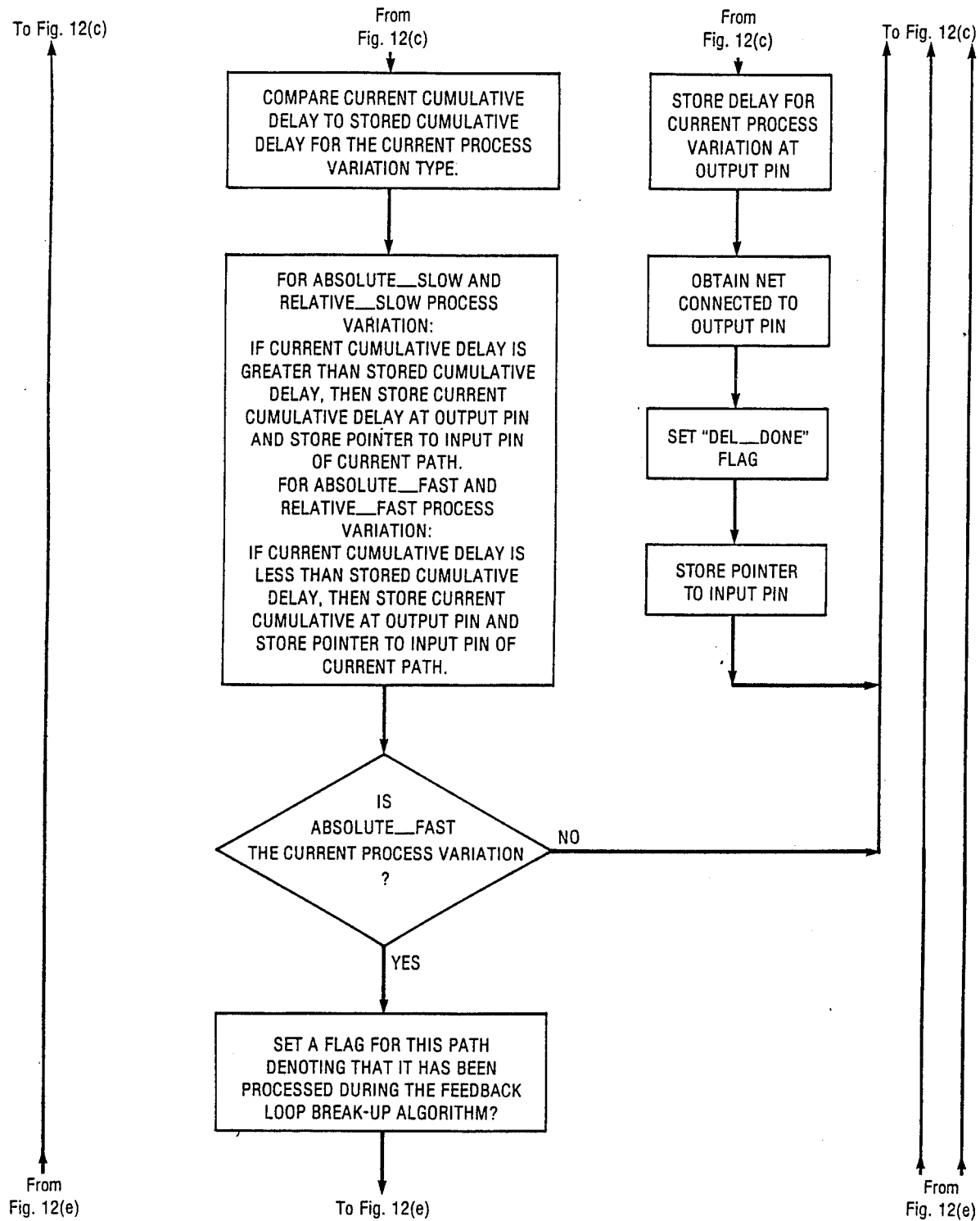
Figure 12E:
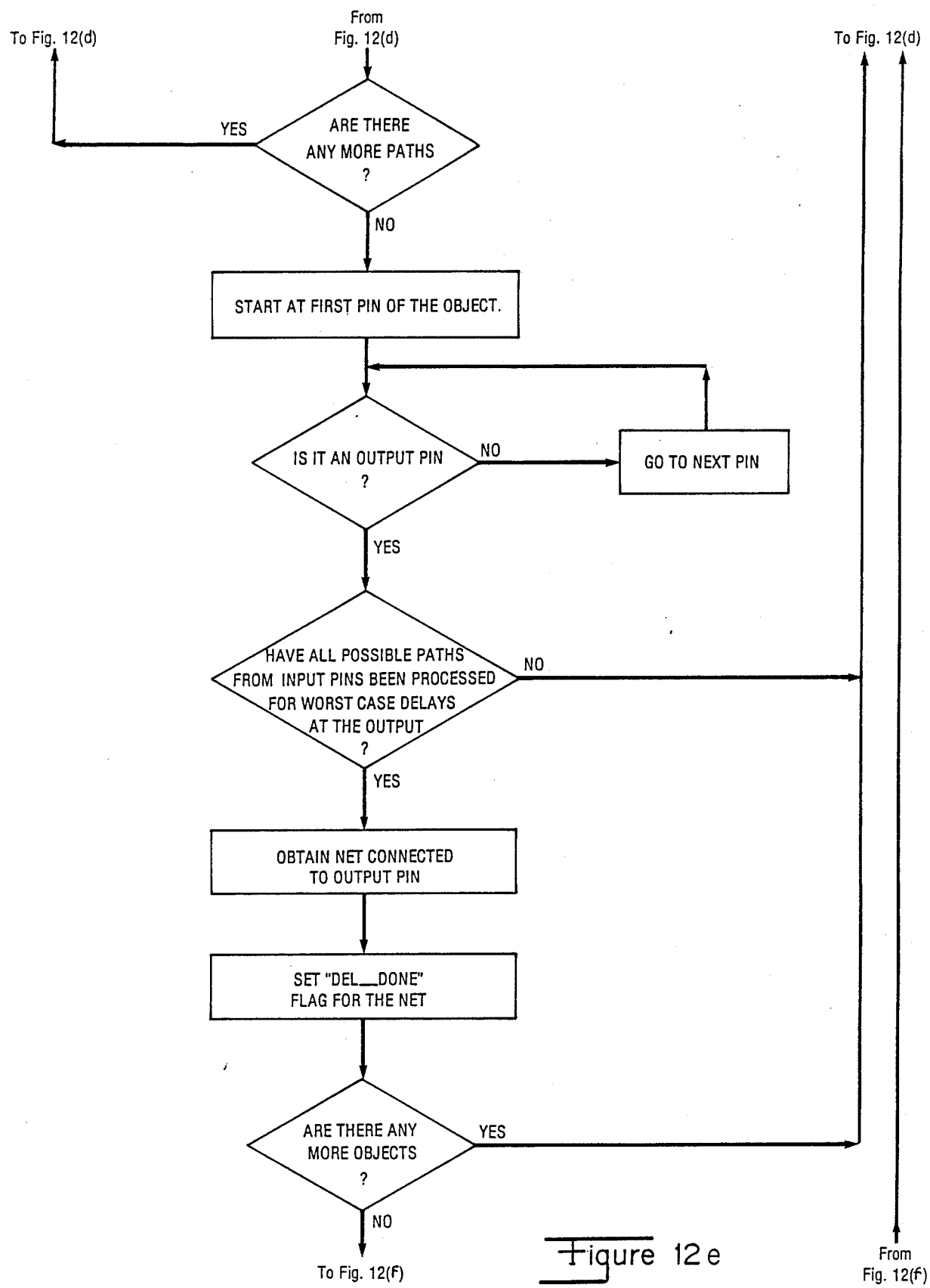
Figures 12, 12F:
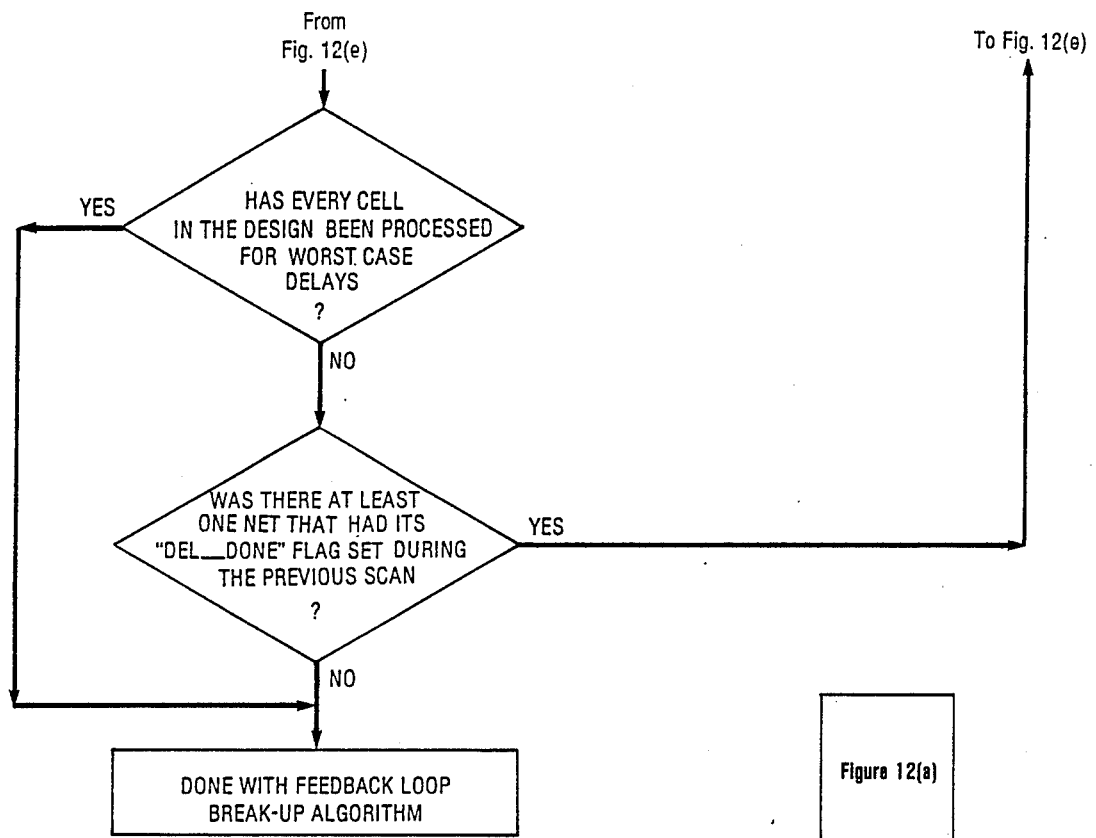
Figure 13A:
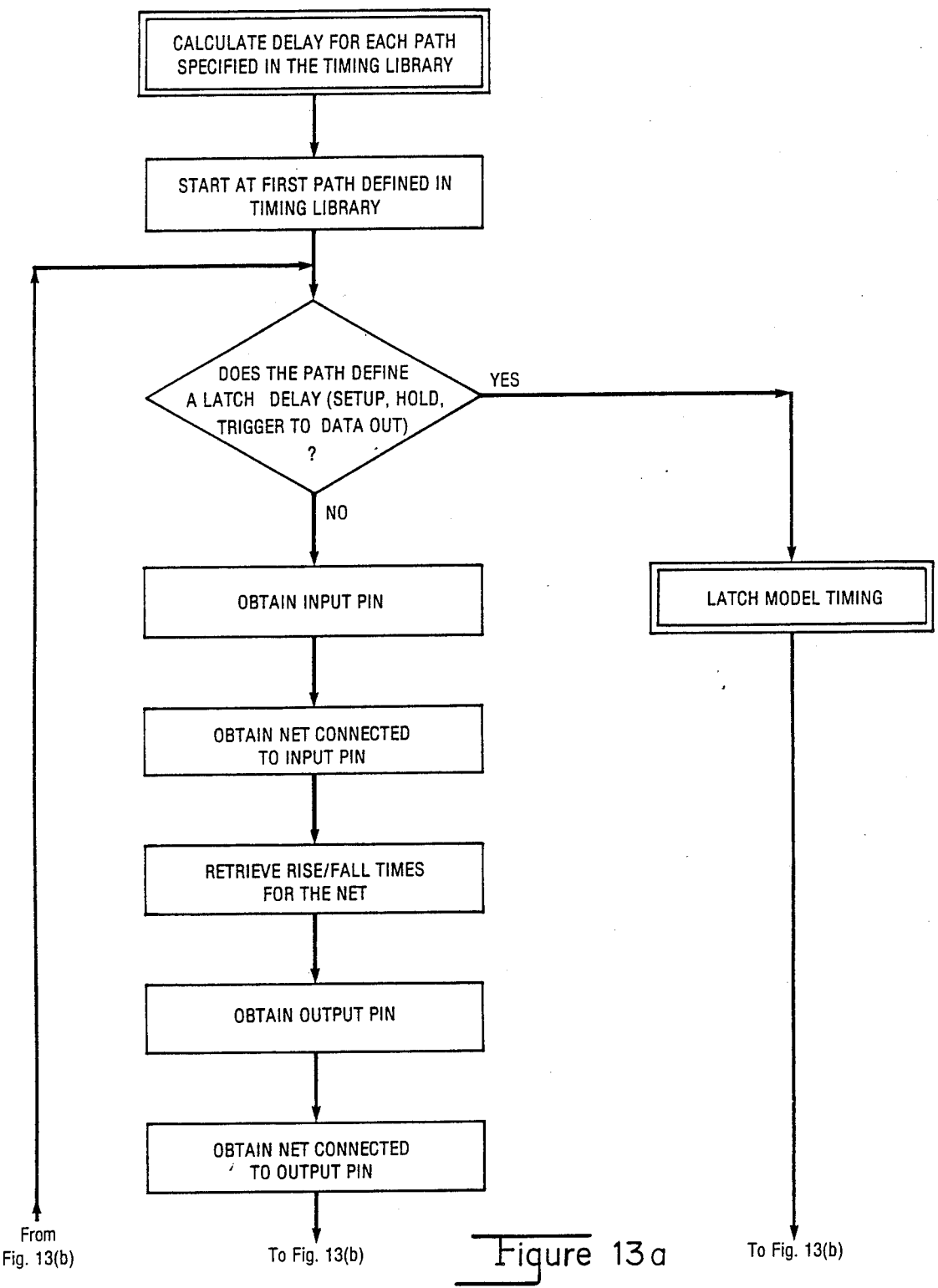
FIGS. 13 and 13(a) and (b) comprise a chart illustrating the logical flow through the subroutine of FIG. 11 to calculate delay for each path specified in the Timing Library.
Figure 13B:
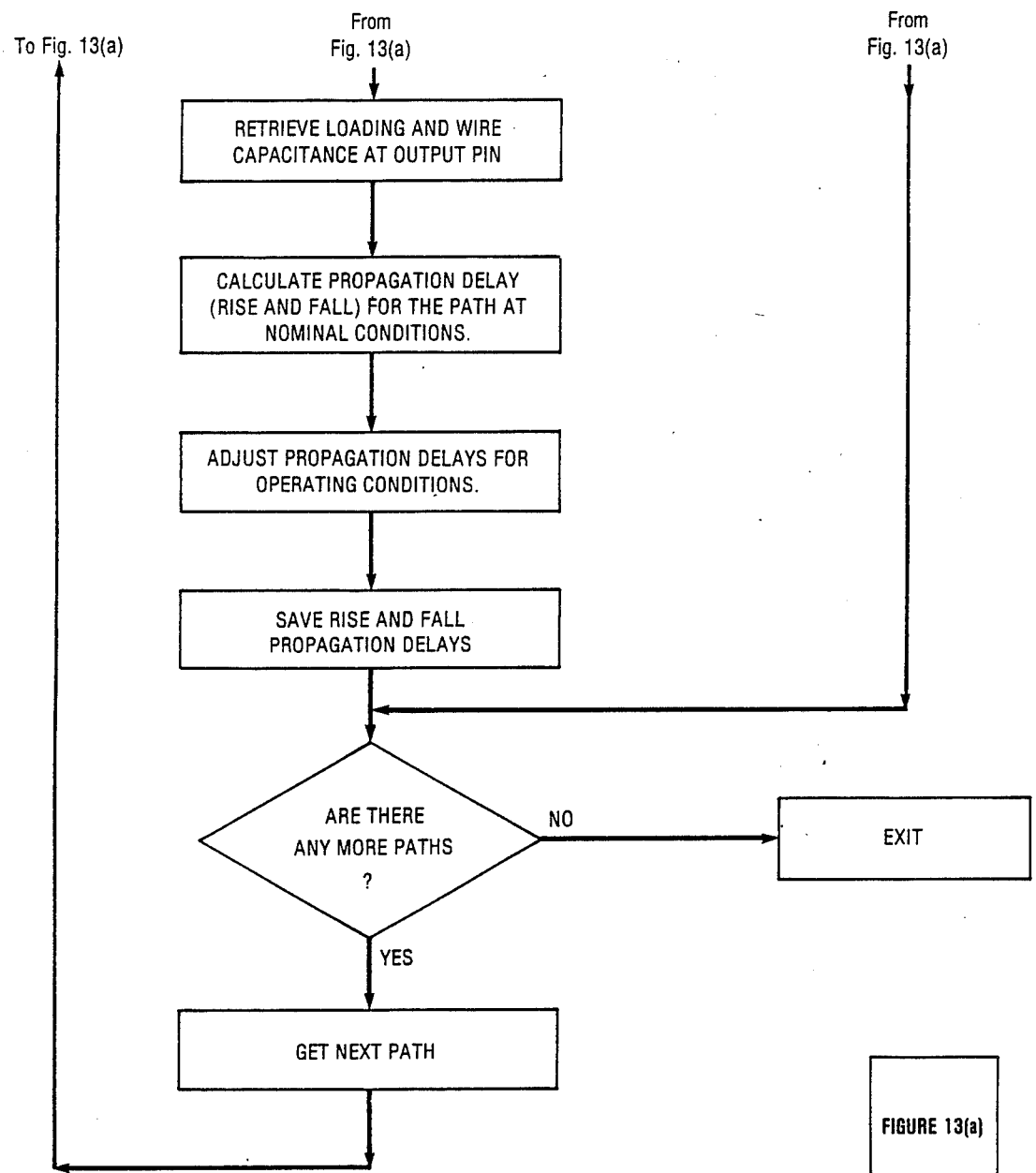
Figure 13:
Figure 14A:
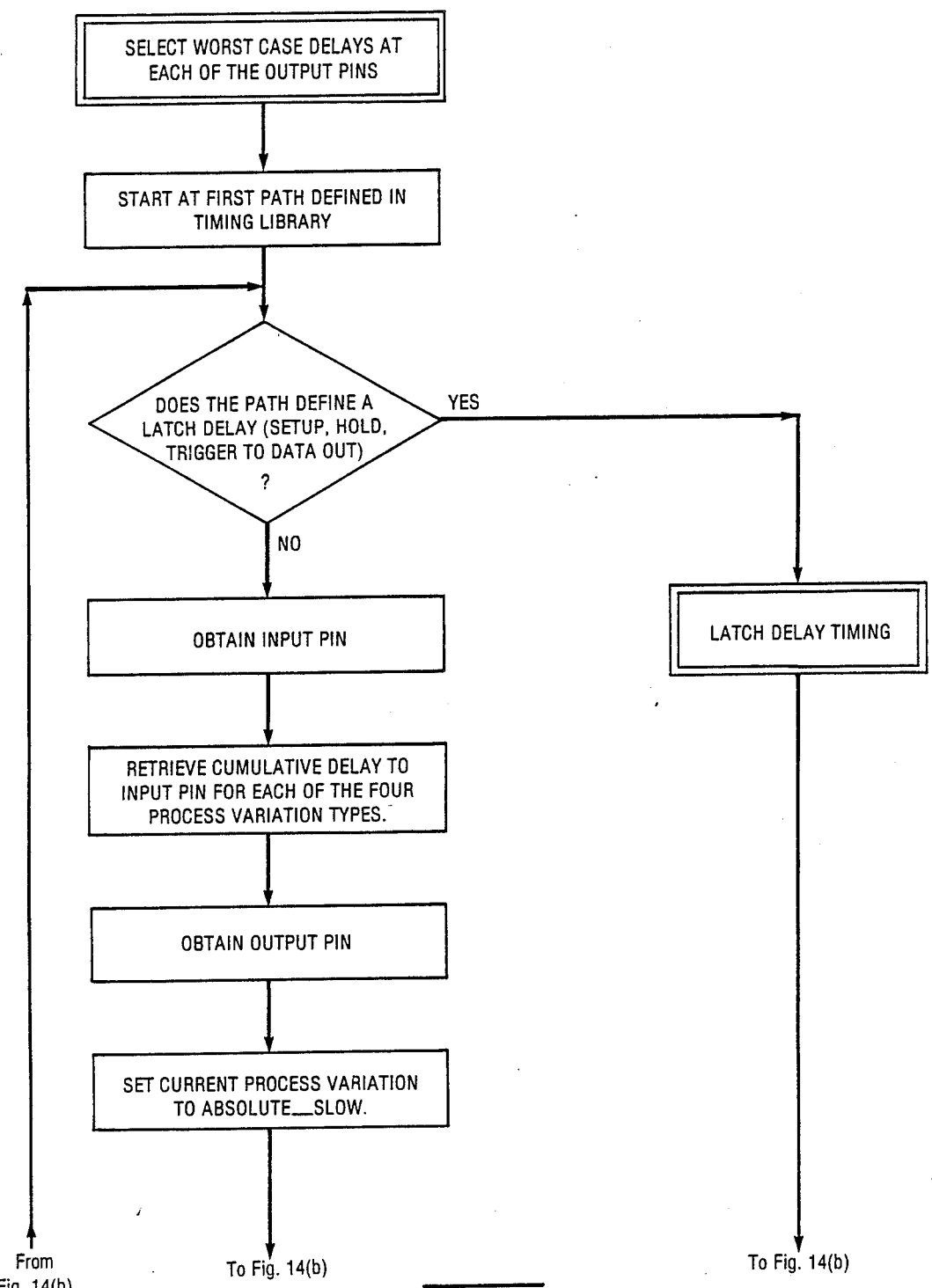
FIGS. 14 and 14(a) through (d) comprise a chart illustrating the logical flow through the subroutine of FIG. 11 to select worst case delays at each of the output pins.
Figure 14B:
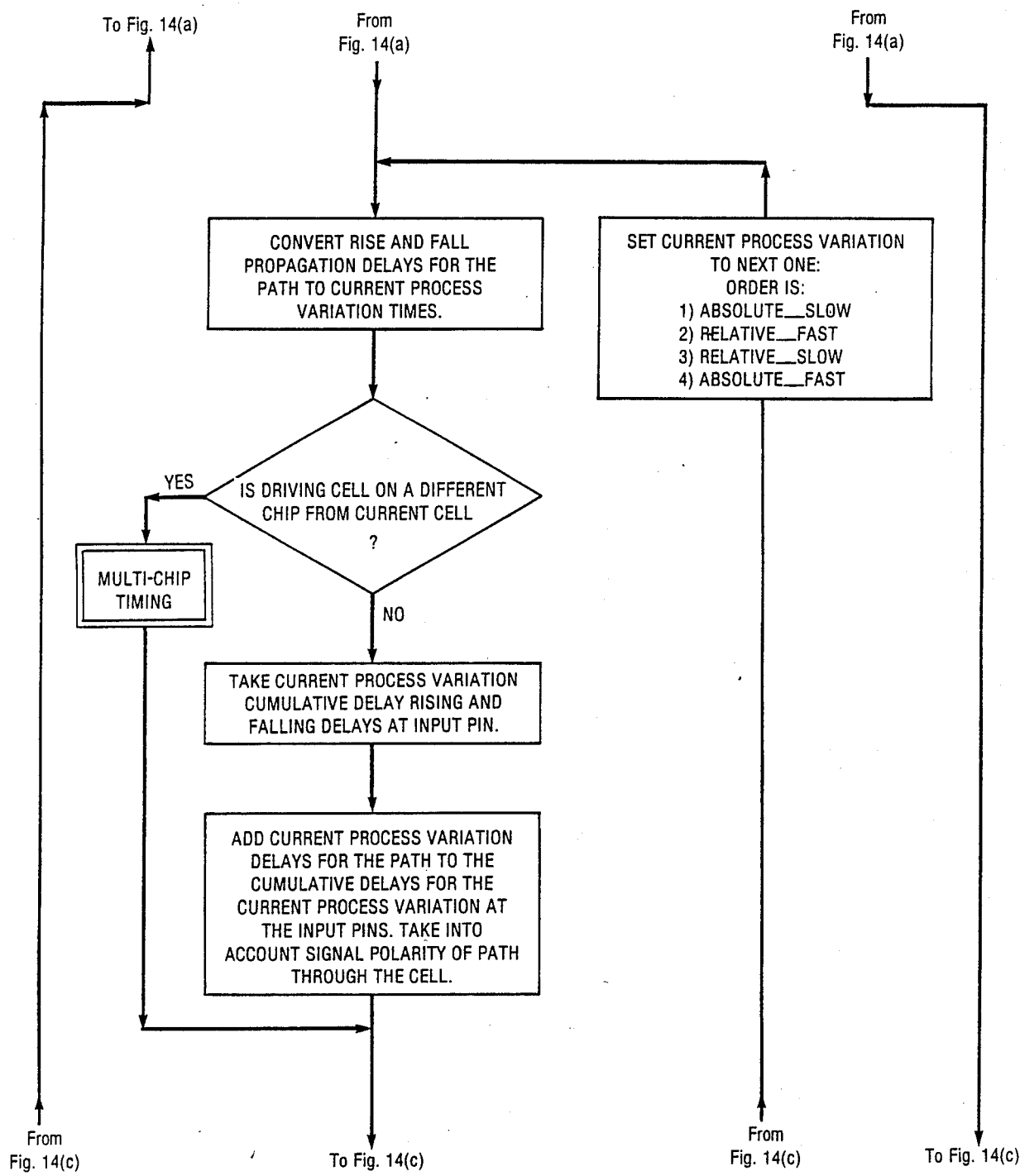
Figure 14C:
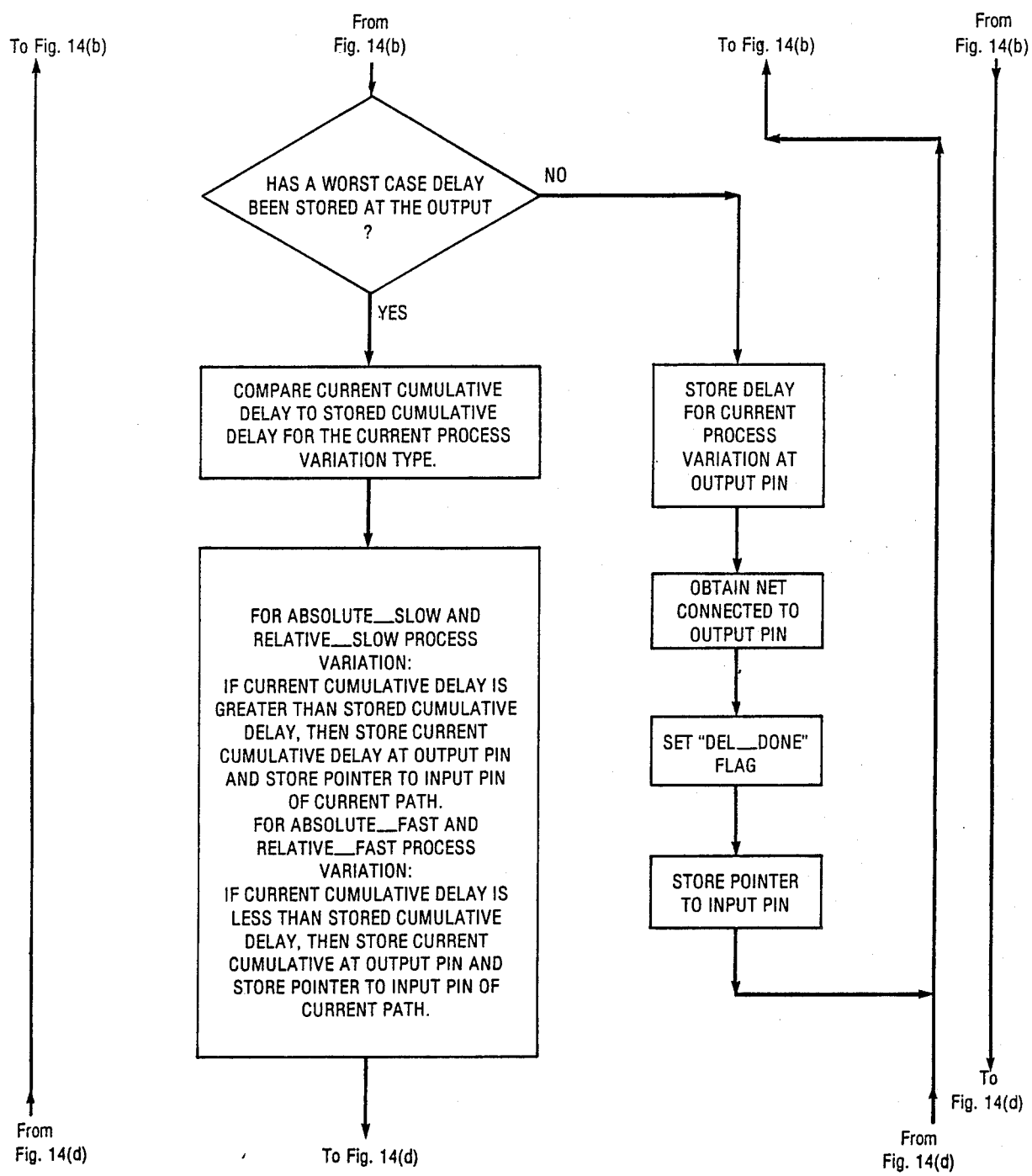
Figures 14, 14D:
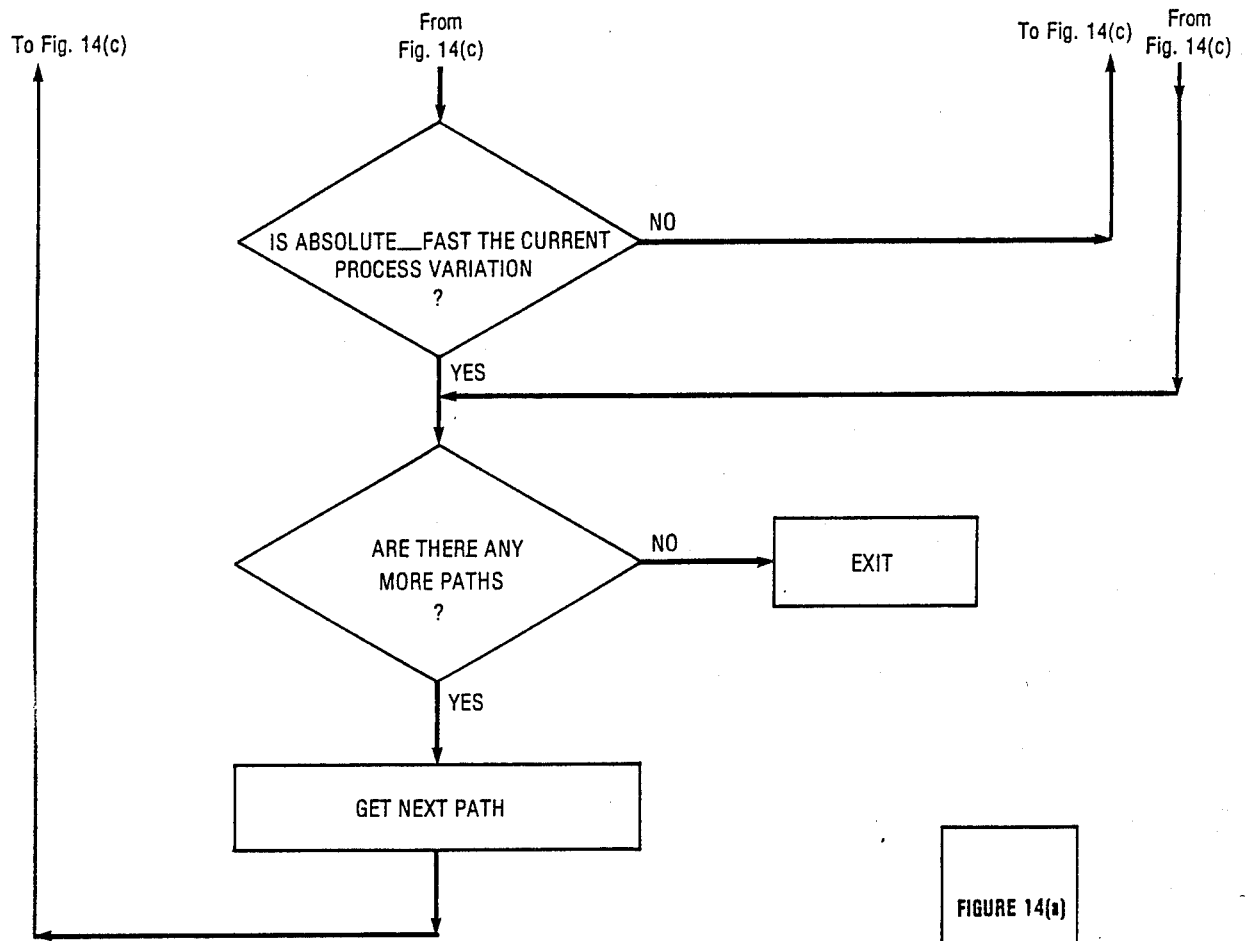
Figure 16:
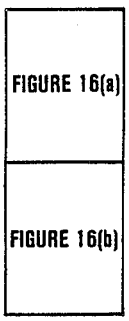
FIGS. 16 and 16(a) and (b) comprise a chart illustrating the logical flow through the subroutine of FIG. 14(a) for latch delay timing.
Figure 16A:
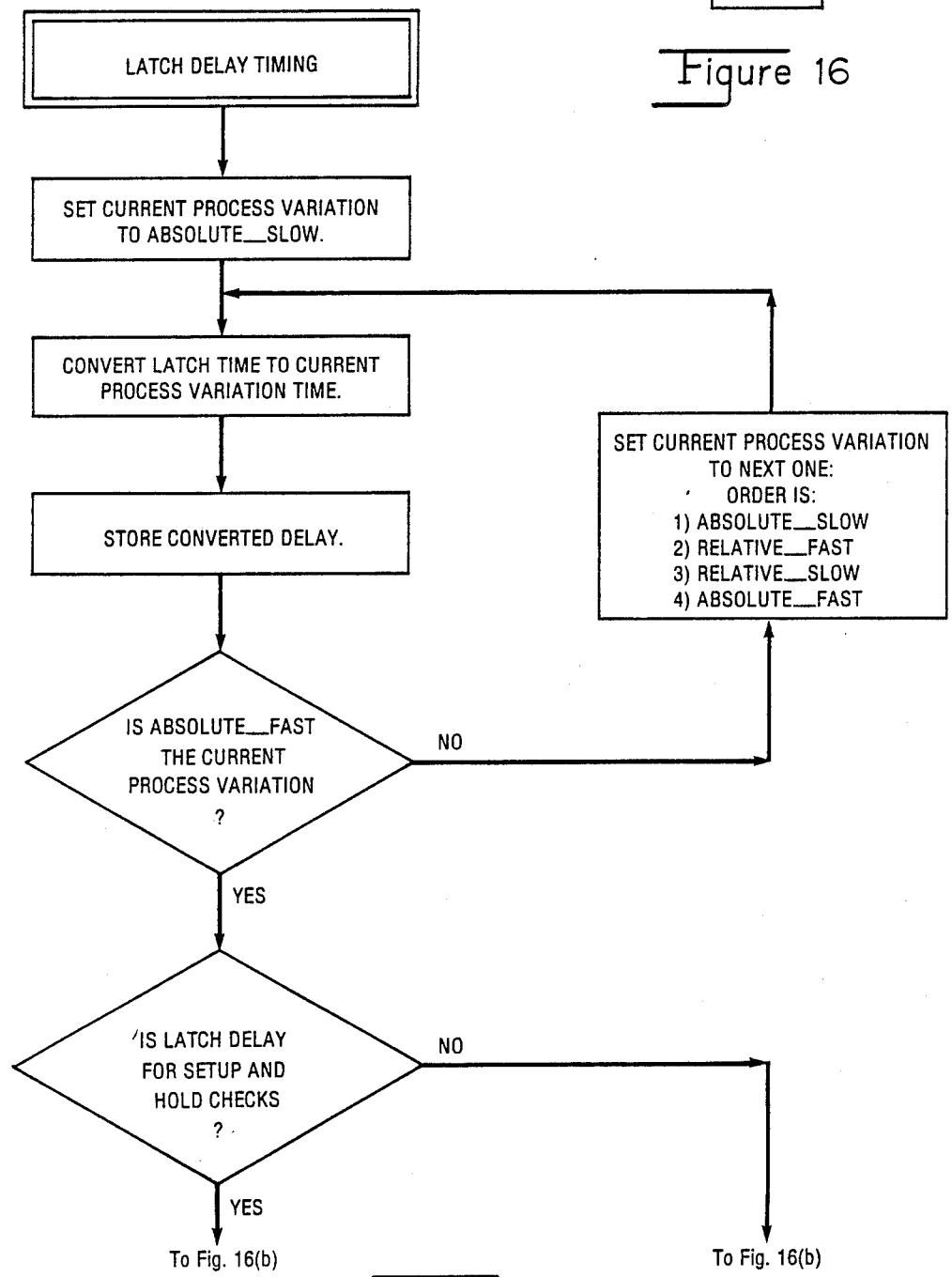
Figure 16B:
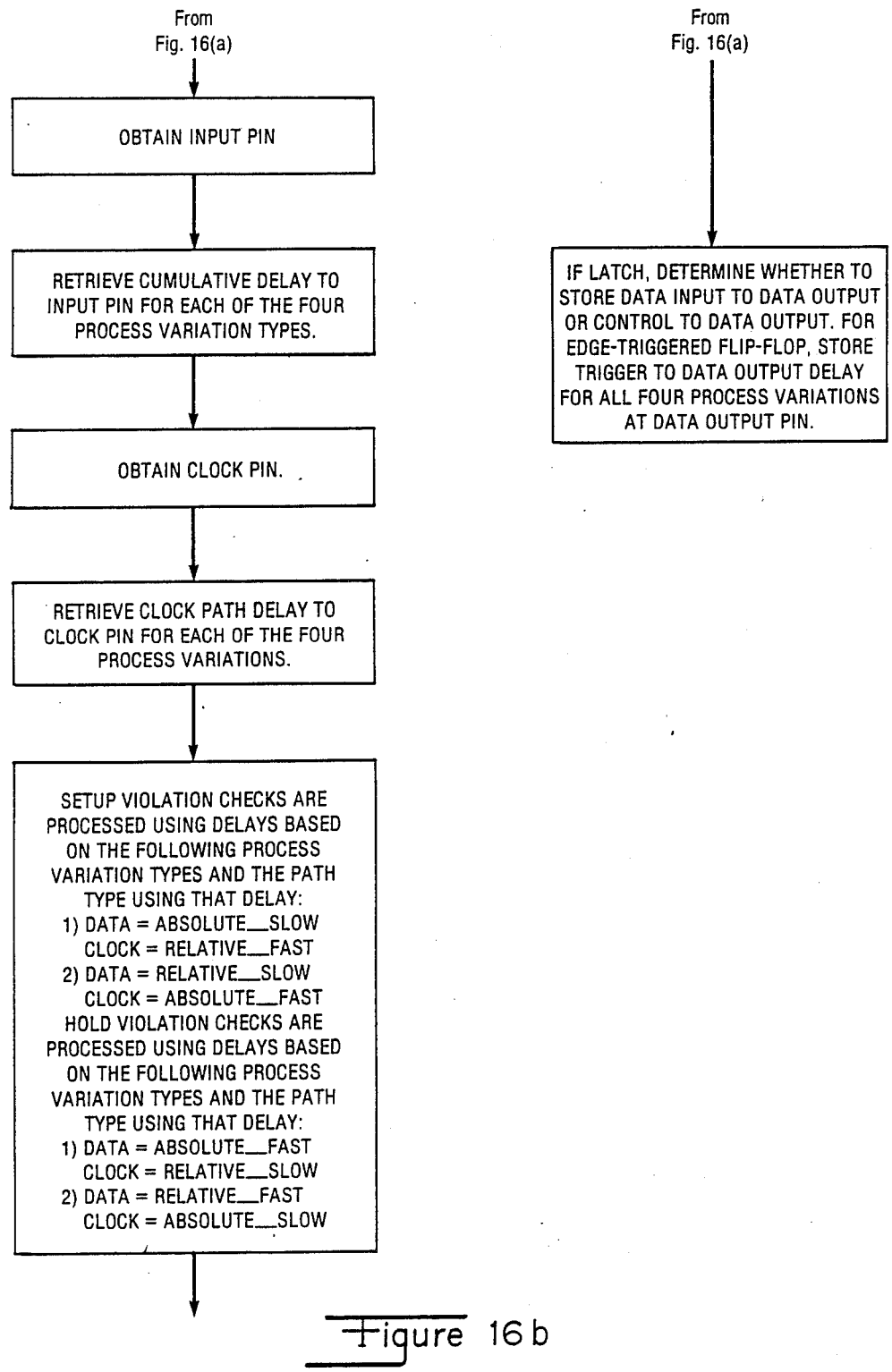
Figure 15:
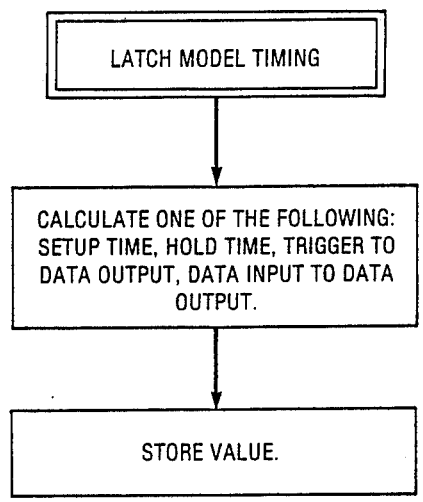
FIG. 15 is a chart illustrating the logical flow through the subroutine of FIG. 13(a) for latch model timing.
Figure 17:
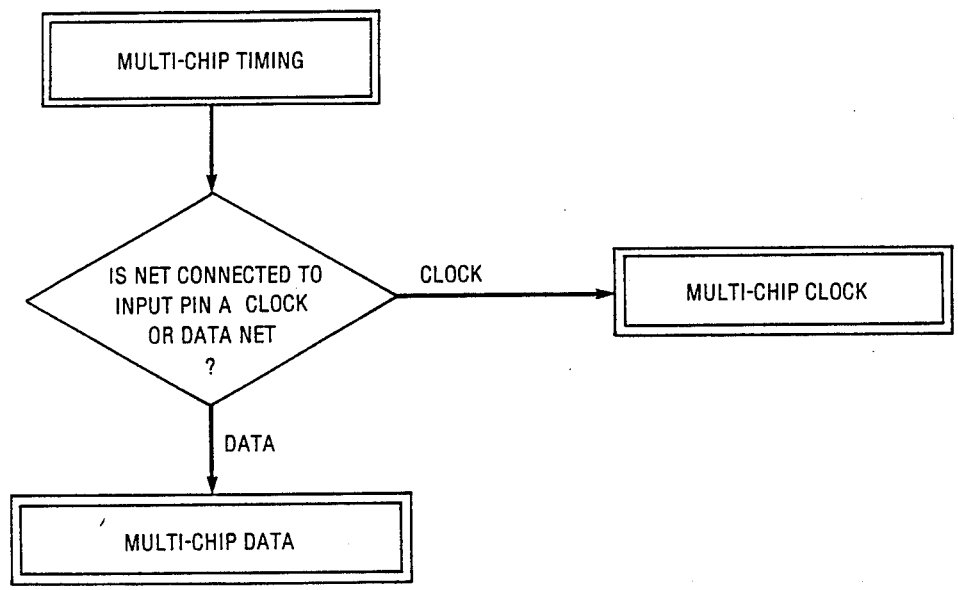
FIG. 17 is a chart illustrating the logical flow through the subroutine of FIG. 14(b) for multi-chip timing.
Figure 18:
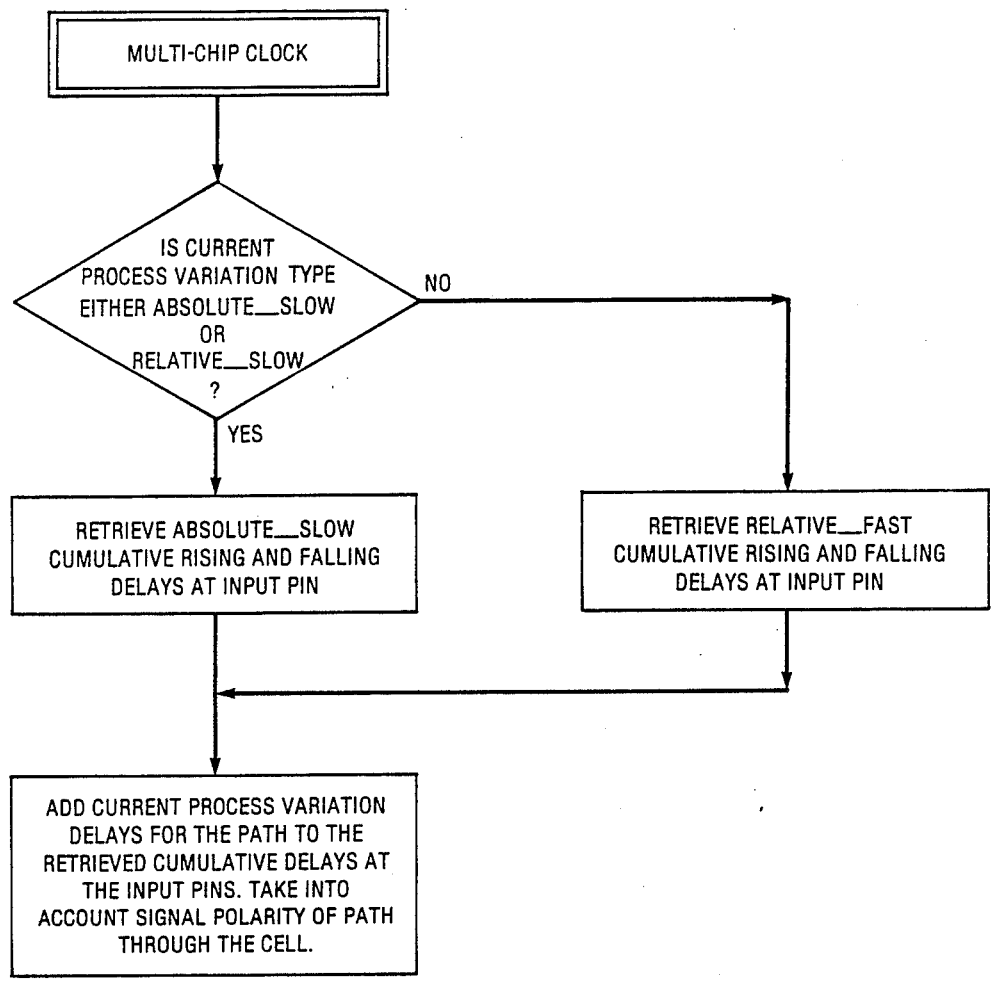
FIG. 18 is a chart illustrating the logical flow through the subroutine of FIG. 17 for multi-chip clock.
Figure 19:
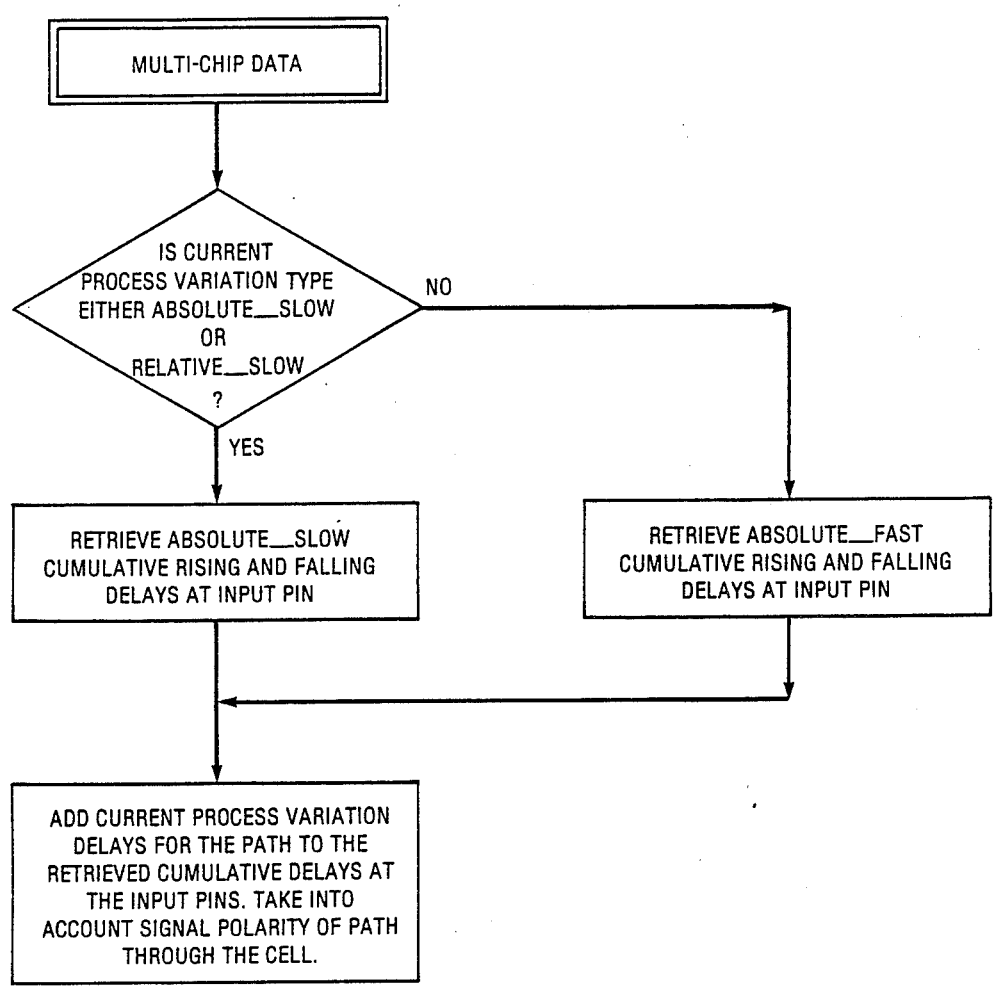
FIG. 19 is a chart illustrating the logical flow through the subroutine of FIG. 17 for multi-chip data.

More specifically, the routine by which the propagation delays for proposed logic are calculated according to the present invention is illustrated in the flow chart of FIG. 7. The subroutine listed in bold type for setting up the Timing Library, and for invoking the Levelization Algorithm are illustrated in FIGS. 8 and 9, respectively. The subroutines listed in bold type in FIG. 9 for Processing Signals that Interface to Input Ports, and for Processing Paths through Cells, and for Feedback Loop Break-Up are illustrated in FIGS. 10, 11 and 12, respectively. The subroutines listed in bold type in FIG. 11 for Calculating the Delay for Each Path Specified in the Timing Library, and for Selecting Worst-Case Delays at Each Output Pin are illustrated in FIGS. 13 and 14, respectively. The subroutine listed in bold type in FIG. 13 for Latch Model Timing is illustrated in FIG. 15, and the subroutine listed in bold type in FIG. 14 for Latch Delay Timing and Multi-Chip Timing are illustrated in FIGS. 16 and 17, respectively. The subroutine listed in bold type in FIG. 17 for Multi-Chip Clock and Multi-Chip Data are illustrated in FIGS. 18 and 19, respectively. Execution of the routine, and its subroutines, may provide the user with a degree of confidence that the proposed logic will operate correctly at the chosen clock speed, as more fully described below, given the timing library parameters of the selected semiconductor manufacturers as the particular fabrication processes contemplated to be used in fabricating the proposed logic design.

If the execution of this routine and its subroutines indicates that the proposed logic will not operate correctly, then it also identifies what portions of the logic comprise the problem, e.g. the accumulated delays total more than the desired clock cycle.

If the topology of the proposed logic cannot be modified to reduce the accumulated delays to satisfy the clock timing requirements, then the subroutines indicate what fastest clock cycle period may be used, given the proposed design. This eliminates a great deal of repetitive experimentation.

Figure 21:
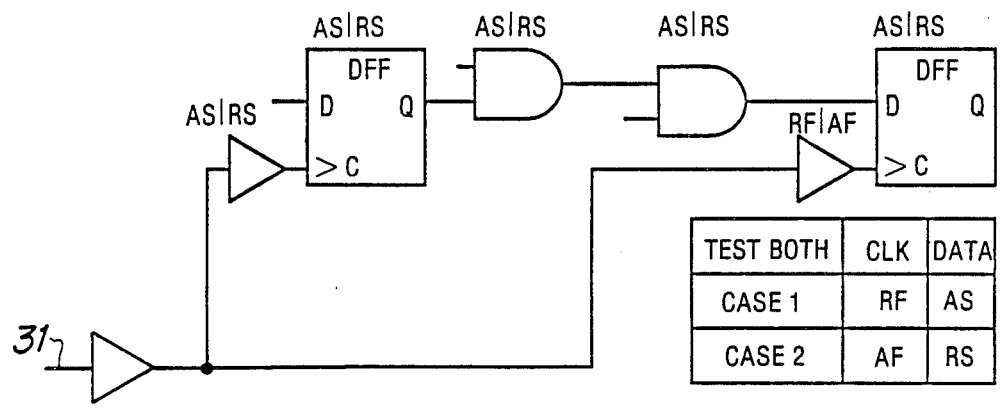
FIG. 21 is a block schematic diagram for illustrating the SET-UP timing analysis on a single chip.
Figure 22:
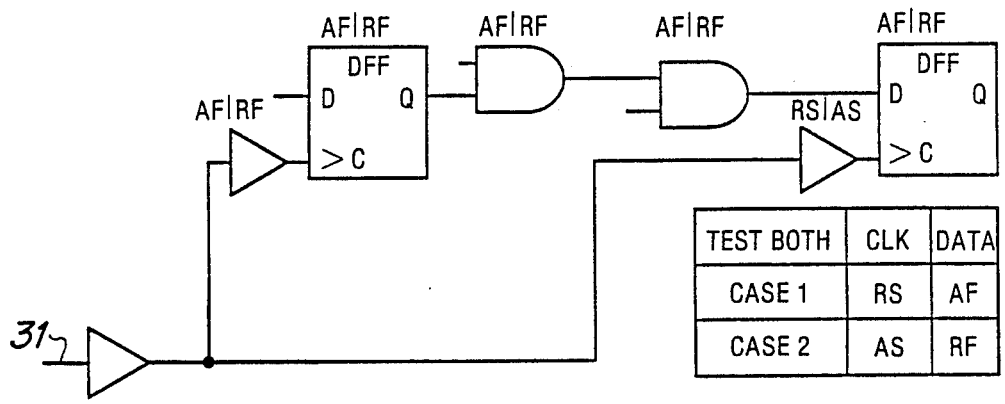
FIG. 22 is a block schematic diagram for illustrating the HOLD timing analysis on a simple chip.

One common error associated with proposed logic is the relative times of occurrence of logic signals and the clock signal. The logic signals usually must propagate through the successive levels of combinational logic to arrive in time at the latch or latches in a successive level of logic to be clocked into such latches. In accordance with the present invention, the propagation delays of logic signals through the proposed logic are calculated to determine times of arrival at selected latches in successive logic levels relative to the clock times. Clock timing information about each type of gate, latch and other logic elements in the proposed logic is stored in memory and recalled for comparison with the times of arrivals of logic signals after accumulated propagation delays to determine whether any timing violations for proper operation of the clocked elements exists. Specifically, with reference to the diagram of a simplified logic circuit on a single integrated circuit, as illustrated in FIG. 21, clock-time SET-UP violations are determined by starting at the clock input pin 31 of the proposed logic to determine the clock circuit tree up to the input of each latch. All such clock-signal paths thus traced through the logic to each latch input are then analyzed for slow-path delays of data relative to fast-path delays of the clock signal to determine whether the clocked SET-UP requirements of the latch (in relation to the data-signal delays accumulated to such latch) are satisfied. Similarly, as illustrated in FIG. 22 for a single chip, the test clock paths are analyzed for fast-path delays of data to the test latch relative to the slow-path delays of the clock signal to determine whether the clocked HOLD requirements of the latch are satisfied, as previously described with reference to Table 2. FIG. 16 illustrates the routine for checking SET-UP or HOLD violations of timing requirements. By this routine, the critical paths (along with the maximum and minimum propagation delays) are identified and the maximum and minimum propagation delays along them are calculated to indicate whether timing requirements of the logic elements along such paths can be satisfied. This can identify the SET-UP and HOLD violations on the chip that occur with a given clock rate, and can suggest the fastest clock rate that the proposed logic can support.

Figure 23:
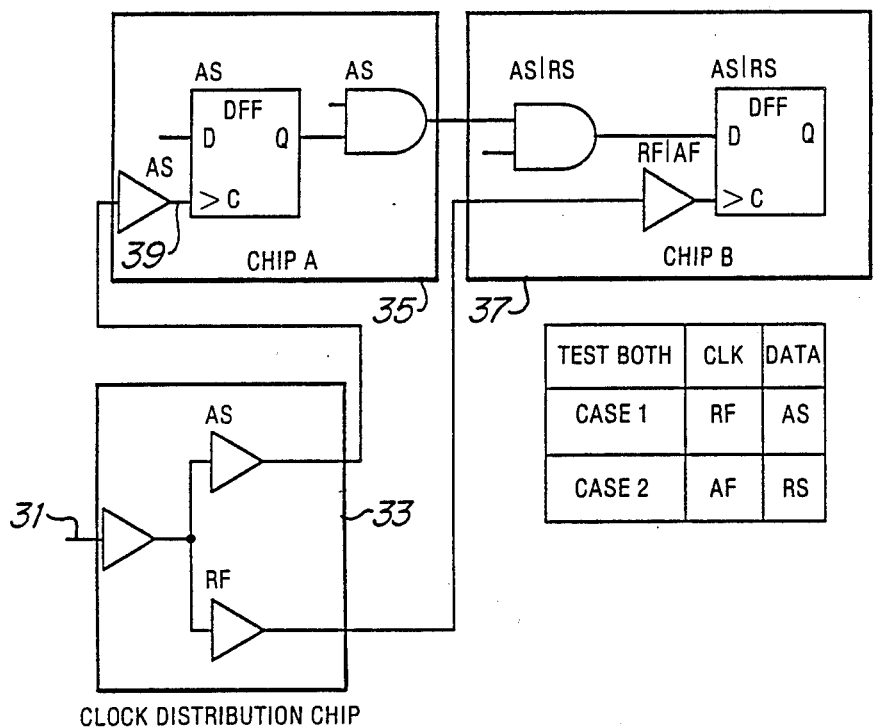
FIG. 23 is a block schematic diagram for illustrating the SET-UP timing analyses on multiple, interconnected chips.
Figure 24:
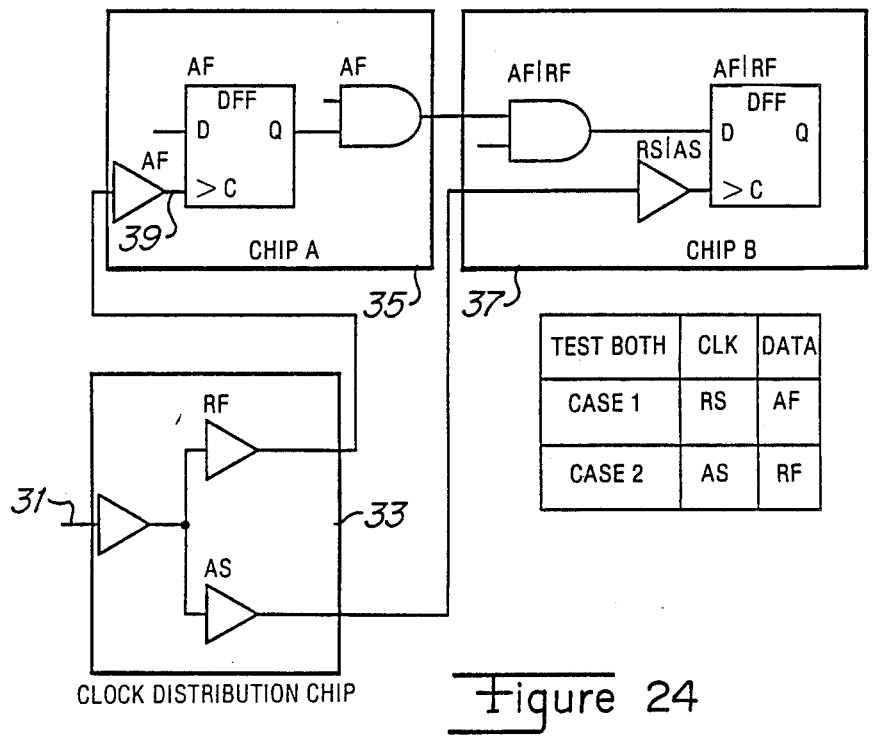
FIG. 24 is a block schematic diagram for illustrating the HOLD timing analyses on multiple, interconnected chips.
Figure 25A:
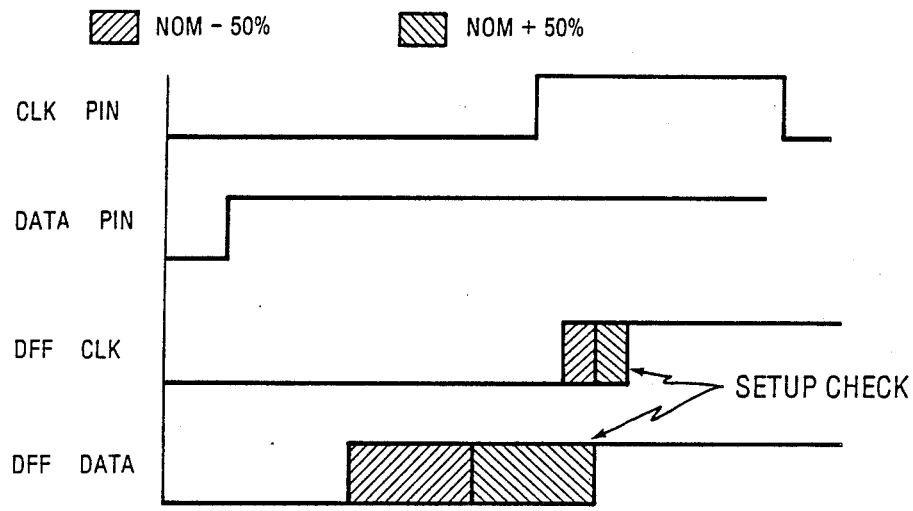
FIGS. 25(a) and (b) are graph illustrating the ranges of signal conditions associated with SET-UP checks.
Figure 25B:
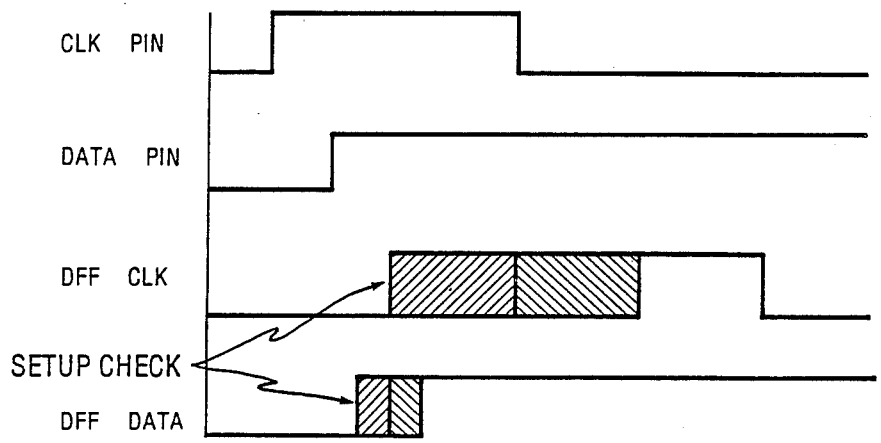

In accordance with the present invention, SET-UP and HOLD clock violations at the board level of multiple, interconnected circuit chips can also be evaluated, as illustrated in FIG. 23 and FIG. 24. The analysis begins at a clock-signal input (ex: pin 31 of the clock chip 33 of the proposed logic) and evaluates the clock 'tree' through other interconnected chips 35, 37 up to the input of each DFF on a given chip. All the clock-signal paths are traced from the clock input 31 on the clock distribution chip 33, through the board connections to the clock inputs of each DFF on each chip. Similarly, all the data paths are traced from the DFF clock input 39, through the chip, and through board interconnections to each DFF data input on each chip. In this manner, each DFF in different chips can be checked for SET-UP timing violations, and for HOLD violations in the manner previously described with reference to single-chip timing violations. Specifically, the correlation of signal delays along a given data signal path and along a given clock-signal path are illustrated in the graphs of FIGS. 25(a) and (b) in which variations in signal delays of ±50% are illustrated.

In accordance with another embodiment of the present invention, conductors connected to clock and data inputs of logic elements or cells in the proposed logic design are recognized as contributing signal propagation delays in relation to the lengths thereof. Most notable, sub-micron line widths and spacings of and among connecting conductors in very-large scale integrated circuits include significant resistance and capacitance per unit length that contribute propagation delays from end to end of each such conductor. In accordance with the present invention, such propagation delay of connecting conductor is included as a library-stored parameter for a particular integrated-circuit technology (and for circuit boards involved in chip interconnections), and is referred to as 'skew' delay. More specifically, such skew delay is added into slow-path analyses (AS and RS), as previously described, but is dropped or not included in fast-path analyses (AF and RF) to assure worst-case and best-case analyses, respectively, of a proposed logic design.

Figure 6C:
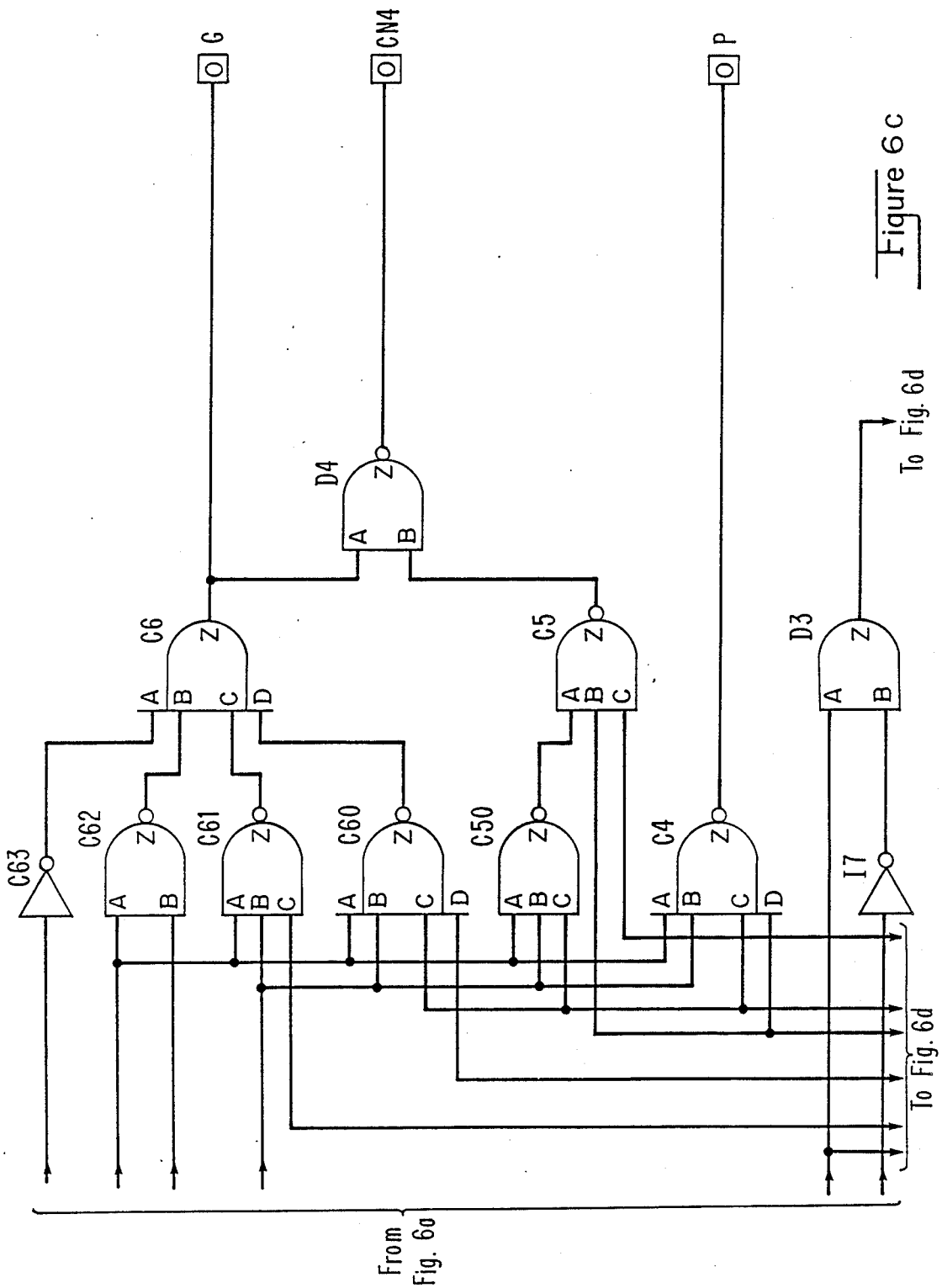
Figure 6D:
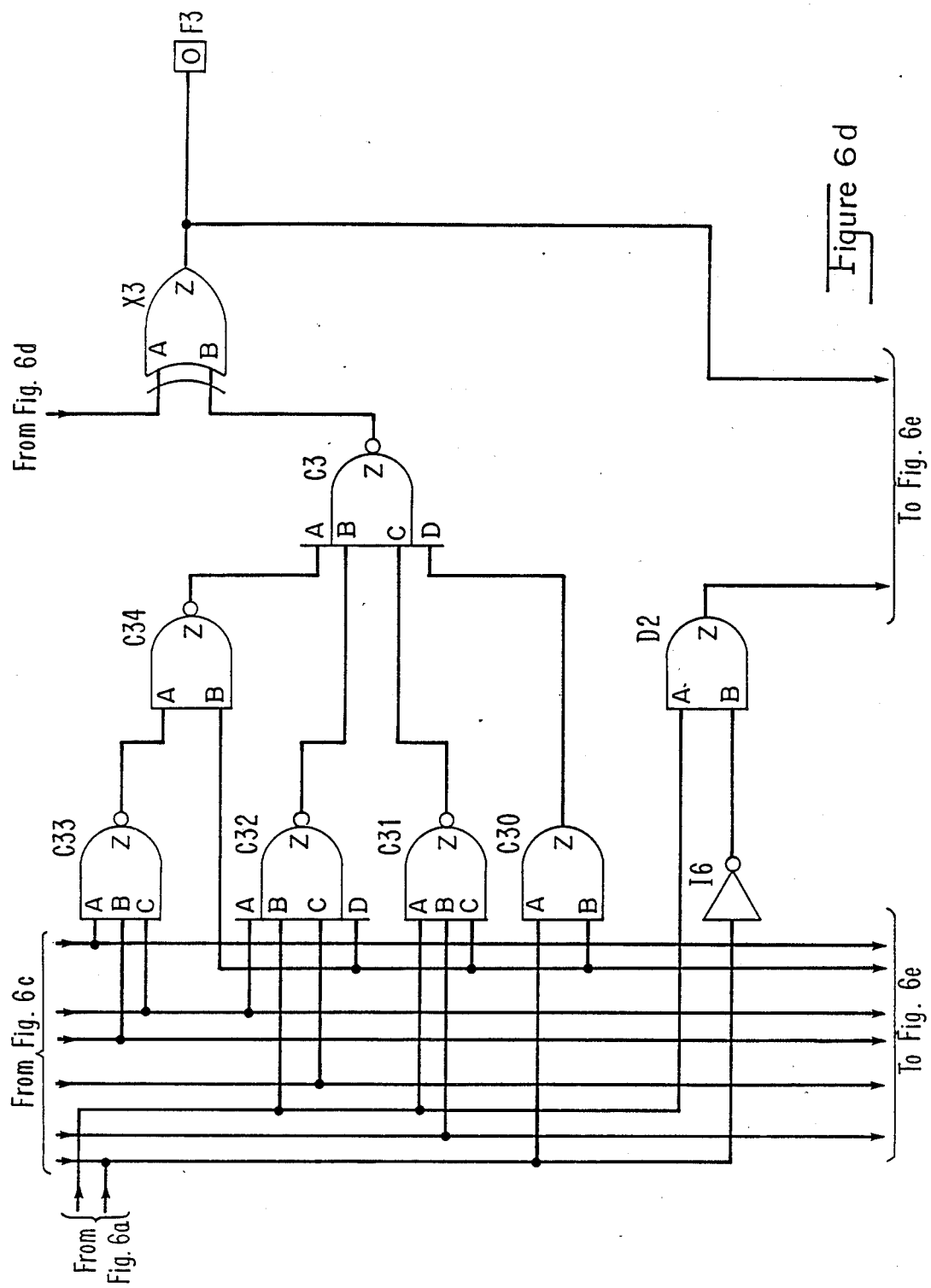
Figure 6E:
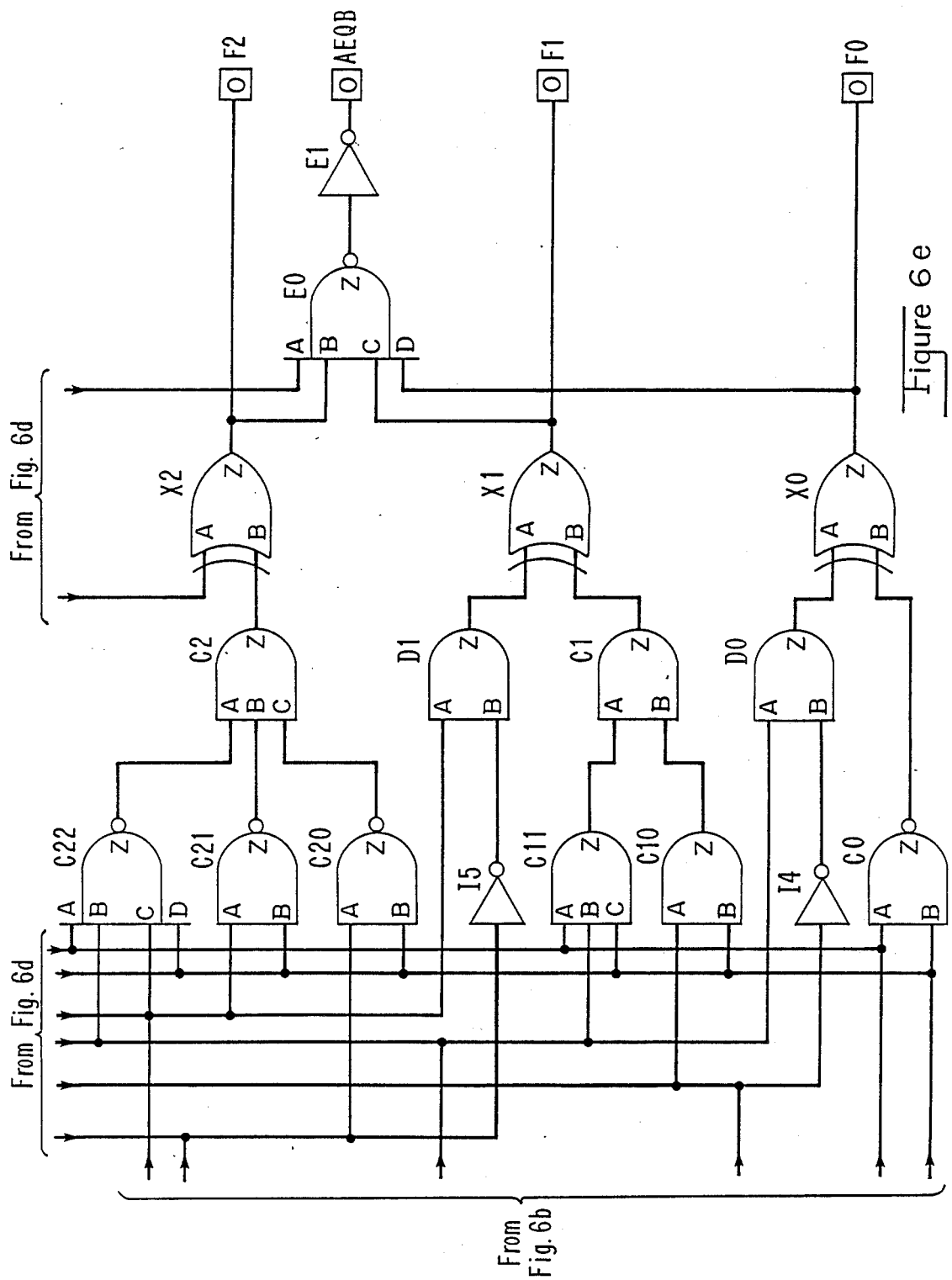

Referring again to the schematic diagram in FIG. 6(a) of a proposed arithmetic logic unit, whether such unit is fabricated on a single chip or is fabricated of multiple, interconnected chips, clock timing violations per chip and over interconnected multiple chips can be analyzed (with and without skew) and reported, as illustrated in the chart of FIG. 6(c). The information thus calculated and displayed in accordance with the present invention greatly facilitates rapid identification of the long paths (say, in excess of selected delay limits) that violate the timing requirements in the proposed logic design. In addition, since the worst-case of accumulated propagation delays can be analysed in this manner, then the fastest clock cycle time can be designated at which such proposed logic design can be operated without design-rule violations or logic failures. With the paths identified that violate clock-timing requirements or that exceed selected limits of propagation delay generally in accordance with the present invention, a circuit designer can back-trace the signal and clock paths, retaining all accumulated parameters and manufacturing tolerances from point to point and chip by chip, in order to facilitate logic design modifications prior to fabricating the proposed logic design for testing in integrated-circuit form. In this manner, each DFF in different chips can be checked for SET-UP timing violations, and for HOLD violations in the manner previously described with reference to single-chip timing violations.

With reference now to FIG. 20, a histogram of propagation delays along signal paths of a proposed logic design can be prepared according to the present invention, say, with 2 nanosecond increments along the vertical axis and with number of paths charted on the horizontal axis in order to illustrate the distribution of propagation delays through the proposed logic. Such histogram is commonly useful to a circuit designer in early stages of the circuit design process as an indication of typical propagation delays and of the critical-path delays associated with a proposed logic design.

What is claimed is:

1. A method of verifying time-oriented operating requirements of a logic circuit including logic elements that are to be fabricated as semiconductor circuits to operate with propagation delays therethrough on applied data and clock signals that are correlated within predetermined ranges of timing parameters, the method comprising the steps of:

designating for each of the logic elements the absolute fast and relative slow extremes of one range of propagation delays therethrough;

designating for each of said logic elements the relative fast and absolute slow extremes of another range of propagation delays therethrough;

tracing selected data signal paths including logic elements through the logic circuit;

tracing selected clock signal paths through the logic circuit to selected logic elements;

accumulating the propagation delays at said absolute fast, relative slow, relative fast and absolute slow extremes of said ranges for logic elements along both the selected clock path and data signal path;

comparing the accumulated absolute fast path values to the relative slow path values of one range of propagation delays of the respective clock and data paths through the selected logic elements to determine the correlation of said absolute fast path values and said relative slow path values within a predetermined range of timing parameters; and comparing the accumulated relative fast path values to the absolute slow path values of another range of propagation delays of the respective clock and data paths through the selected logic elements to determine the correlation of said relative fast path values and said absolute slow path values within a predetermined range of timing parameters.

2. The method according to claim 1 comprising the steps of identifying each of the logic elements for which the accumulated values of propagation delays in the clock and data signals along the selected respective clock and data signal paths to such logic element do not correlate within the predetermined range of timing parameters; and back-tracing along each of the selected clock and data signal paths from each such logic element to identify preceeding logic elements and the associated clock and data signal propagation delays associated therewith along said paths.

3. The method according to claim 1 wherein a selected logic element operates upon applied clock and data signals which are correlated within a required SET-UP interval, the method comprising in the step of accumulating the propagation delays at said relative slow and absolute slow extremes, accumulating the longest propagation delays along the selected data signal path;

in the step of accumulating the propagation delays at said absolute fast and relative fast extremes, accumulating the shortest propagation delays along the selected clock signal path;

in the step of comparing, comparing the accumulated absolute slow propagation delay of data signals along the selected data path with the accumulated relative fast propagation delay of clock signal along the selected clock signal path to said selected logic element for correlation thereof within said required SET-UP interval; and comparing the accumulated relative slow propagation delay of data signals along the selected data path with the accumulated absolute fast propagation delay of the clock signal along the selected clock signal path to said selected logic element for correlation thereof within said required SET-UP interval.

4. The method of verifying time-oriented operating requirements of a logic circuit according to claim 3 in which the elements are to be fabricated as semiconductor circuits with connections therebetween that include skew propagation delay over the length thereof, the method comprising in the step of accumulating the propagation delays at said relative slow and absolute slow extremes, accumulating the longest propagation delays including the skew propagation delays of connections along the selected data signal path; and in the step of accumulating the propagation delays at said absolute fast and relative fast extremes, accumulating the shortest propagation delays excluding the skew propagation delays along the selected clock signal path.

5. The method according to claim 1 wherein a selected logic element operates upon applied clock and data signals which are correlated within a required HOLD interval, the method comprising in the step of accumulating the propagation delays at said absolute fast and relative fast extremes, accumulating the shortest propagation delays along the selected data signal path;

in the step of accumulating the propagation delays at said relative slow and absolute slow extremes, accumulating the longest propagation delays along the selected clock signal path; and in the step of comparing, comparing the accumulated absolute fast propagation delay of data signals along the selected data path with the accumulated relative slow propagation delay of clock signal along the selected clock signal path to said selected logic element for correlation thereof within said required HOLD interval, and comparing the accumulated relative fast propagation delay of data signals along the selected data path with the accumulated absolute slow propagation delay of the clock signal along the selected clock signal path to said selected logic element for correlation thereof within said HOLD interval.

6. The method of verifying time-oriented operating requirements of a logic circuit according to claim 5 in which the elements are to be fabricated as semiconductor circuits with connections therebetween that include skew propagation delay over the lengths thereof, the method comprising in the step of accumulating the propagation delays at said relative fast and absolute fast extremes, accumulating the shortest propagation delays excluding the skew propagation delays of connections along the selected data signal path; and in the step of accumulating the propagation delays at said absolute slow and relative slow extremes, accumulating the longest propagation delays including the skew propagation delays along the selected clock signal path.

7. The method of verifying time-oriented operating requirements of a logic circuit according to claim 1 in which the logic elements are to be fabricated as a plurality of semiconductor circuit chips to operate with propagation delays therethrough on applied data and clock signals that are correlated within predetermined ranges of timing parameters, wherein the method is performed independently for the logic elements on each circuit chip.

8. The method according to claim 7 in which the logic elements on individual semiconductor circuit chips are to be interconnected by conductors having skew propagation delay associated therewith, and wherein in the steps of accumulating propagation delays, the skew delays of the conductors are included in the accumulated delays along clock signal and data signal paths for the longest propagation delays and are excluded from the accumulated delays for the shortest propagation delays.

9. A method of verifying time-oriented operating requirements of a logic circuit including logic elements that are to be fabricated as semiconductor circuits to operate within a plurality of ranges of propagation delays therethrough on applied first and second signals that are correlated within predetermined ranges of timing parameters, the method comprising the steps of:

designating for each of the logic elements at least four extremes of propagation delays therethrough including absolute slow and relative fast and absolute fast and relative slow;

tracing selected first signal paths including logic elements through the logic circuit;

tracing selected second signal paths through the logic circuit to selected logic elements;

selectively accumulating the propagation delays at both absolute and relative extremes of ranges for each logic element along the selected first signal path;

selectively accumulating the propagation delays at both absolute and relative extremes of ranges for each logic element along the selected second signal path to the selected logic element; and comparing the accumulated absolute slow and relative slow values of first signal propagation delays along the selected first signal path to the selected logic element with the accumulated respective relative fast and absolute fast values of second signal propagation delays along the selected second signal path to the selected logic element for correlation of respective accumulated absolute and relative values within each of the predetermined ranges of timing parameters for said logic element.

10. The method according to claim 9 wherein the step of selectively accumulating the propagation delays include:

accumulating only the absolute slow and relative slow propagation delays along the selected first signal path; and accumulating only the relative fast and absolute fast propagation delays along the selected second signal path.

11. The method according to claim 10 wherein one of the first and second signal paths forms the clock signal path between logic elements and the other of the first and second signal paths forms the data path between logic elements.

* * * * *